United States Patent
Du et al.

(10) Patent No.: US 11,970,240 B2
(45) Date of Patent: Apr. 30, 2024

(54) STEERING LINKAGE ASSEMBLY, SUSPENSION, AND VEHICLE

(71) Applicant: ZHEJIANG OKAI VEHICLE CO., LTD., Lishui (CN)

(72) Inventors: Songxian Du, Lishui (CN); Jiangtao Lu, Lishui (CN); Wei Tang, Lishui (CN); Heng Li, Lishui (CN)

(73) Assignee: ZHEJIANG OKAI VEHICLE CO., LTD., Lishui (CN)

( * ) Notice: Subject to any disclaimer, the term of this patent is extended or adjusted under 35 U.S.C. 154(b) by 0 days.

(21) Appl. No.: 17/974,565

(22) Filed: Oct. 27, 2022

(65) Prior Publication Data

US 2023/0339565 A1    Oct. 26, 2023

(30) Foreign Application Priority Data

Jun. 22, 2022 (CN) .......................... 202210429376.9

(51) Int. Cl.
*B62K 5/10* (2013.01)
*B62K 5/027* (2013.01)
*B62K 5/05* (2013.01)
*B62K 5/08* (2006.01)
*B62K 21/12* (2006.01)
*B62K 25/00* (2006.01)

(52) U.S. Cl.
CPC ................ *B62K 5/10* (2013.01); *B62K 5/027* (2013.01); *B62K 5/05* (2013.01); *B62K 5/08* (2013.01); *B62K 21/12* (2013.01); *B62K 25/00* (2013.01)

(58) Field of Classification Search
CPC . B62K 5/10; B62K 5/027; B62K 5/05; B62K 5/08; B62K 21/12; B62K 25/00; B62K 3/002; B62K 5/00; B62K 21/00; B62K 21/08; B62D 9/02
See application file for complete search history.

(56) References Cited

U.S. PATENT DOCUMENTS 8,070,172 B1 * 12/2011 Smith ....................... B62K 5/05
280/124.135
9,327,789 B1 * 5/2016 Vezina ...................... B62D 9/02
(Continued)

FOREIGN PATENT DOCUMENTS

CN          205220954 U    5/2016
CN          216034881 U    3/2022

*Primary Examiner* — Paul N Dickson
*Assistant Examiner* — Shams Dhanani
(74) *Attorney, Agent, or Firm* — Bayramoglu Law Ofices LLC

(57) ABSTRACT

A steering linkage assembly includes a support member; a connecting portion rotatably arranged on the support member and connected to an external steering member; a first steering linkage; a first ball head rod provided with one end connected to a ball head at a first end of the first steering linkage and the other end connected to the support member; a second steering linkage; and a steering rotating shaft mounted at a first end of the second steering linkage and rotatably connected to the support member. A rotating centerline of the steering rotating shaft is not parallel to that of the connecting portion. An included angle is formed between a connecting line of ball head centers of the first and second ball head rods and a connecting line of a rotating center of the steering rotating shaft and a ball head center of the third ball head rod.

14 Claims, 20 Drawing Sheets

(56) References Cited

U.S. PATENT DOCUMENTS

| | | | |
|---|---|---|---|
| 11,192,414 B1* | 12/2021 | Berardi | B60G 7/003 |
| 2002/0190494 A1* | 12/2002 | Cocco | B62K 5/027 |
| | | | 280/124.135 |
| 2008/0272568 A1* | 11/2008 | Matschl | B62K 5/08 |
| | | | 280/89 |
| 2011/0006498 A1* | 1/2011 | Mercier | B62D 9/02 |
| | | | 280/124.103 |
| 2017/0088214 A1* | 3/2017 | Ohno | B62K 21/18 |
| 2018/0281886 A1* | 10/2018 | Mizuno | B62D 9/02 |
| 2018/0290684 A1* | 10/2018 | Suda | B60W 30/04 |
| 2019/0367125 A1* | 12/2019 | Socci | B62K 5/027 |
| 2021/0206446 A1* | 7/2021 | Araki | B60G 3/20 |
| 2021/0269017 A1* | 9/2021 | Araki | B60W 30/045 |
| 2022/0204079 A1* | 6/2022 | Takimoto | B60G 7/005 |
| 2023/0031917 A1* | 2/2023 | Dray | B62K 3/002 |
| 2023/0035453 A1* | 2/2023 | Omari | A63C 17/12 |
| 2023/0182850 A1* | 6/2023 | Calderon | B60G 3/20 |
| | | | 280/269 |

* cited by examiner

STEERING LINKAGE ASSEMBLY, SUSPENSION, AND VEHICLE

CROSS REFERENCE TO THE RELATED APPLICATION

This application claims priority based on Chinese patent application No. 202210429376.9 filed on Apr. 22, 2022, the entire contents of which are hereby incorporated by reference.

TECHNICAL FIELD

The present disclosure relates to the technical field of scooters, and in particular, to a steering linkage assembly, a suspension, and a vehicle.

BACKGROUND

At present, inverted three-wheeled electric scooters are quite popular.

In Chinese Patent CN201520904016.5, a scooter having a novel steering mechanism is disclosed. However, in this technical solution, two double-front wheels are rigidly mounted, resulting in relatively poor comfort during driving.

In Chinese Patent 202122238429.2 previously filed by the applicant, a suspension structure is disclosed. However, in this technical solution, during steering, the steering resistance is large, which affects the steering of a vehicle.

SUMMARY

To solve the technical problems in at least one aspect in the background art, the present disclosure provides a steering linkage assembly, a suspension, and a vehicle.

The steering linkage assembly provided by the present disclosure includes:
  a support member;
  a connecting portion rotatably arranged on the support member and connected to an external steering member;
  a first steering linkage;
  a first ball head rod provided with one end connected to a ball head at a first end of the first steering linkage and the other end connected to the support member;
  a second steering linkage; and
  a steering rotating shaft mounted at a first end of the second steering linkage and rotatably connected to the support member, where a rotating centerline of the steering rotating shaft is not parallel to a rotating centerline of the connecting portion.

Preferably, the assembly further includes:
  a second ball head rod provided with one end connected to a ball head at a second end of the first steering linkage; and
  a third ball head rod provided with one end connected to a ball head at a second end of the second steering linkage.

Preferably, a connecting line L1 between a ball head center of the first ball head rod and a ball head center of the second ball head rod has a length of H1; and
  a connecting line L2 between a rotating center of the steering rotating shaft and a ball head center of the third ball head rod has a length of H2, where H2=H1=H.

The present disclosure also provides a suspension, including:
  an auxiliary frame;
  two steering assemblies symmetrically arranged on both sides of the auxiliary frame; and
  two swing arm assemblies distributed symmetrically, where the swing arm assemblies each include:
  an upper swing arm having a first end provided with an upper rotating shaft and a second end movably connected to the steering assembly, where the upper rotating shaft is rotatably connected to the auxiliary frame;
  a lower swing arm having a first end provided with a lower rotating shaft and a second end movably connected to the steering assembly, where the lower rotating shaft is rotatably connected to the auxiliary frame; and
  the steering linkage assembly, where
  the second end of the first steering linkage is movably connected to the steering assembly; and
  the second end of the second steering linkage is movably connected to the steering assembly.

Preferably, the second end of the first steering linkage is connected to the steering assembly through a second ball head rod; the second end of the second steering linkage is connected to
  the steering assembly through a third ball head rod;
  the second end of the upper swing arm is connected to the steering assembly through a fourth ball head rod; and
  the second end of the lower swing arm is connected to the steering assembly through a fifth ball head rod.

Preferably, a connecting line L3 between a rotating center of the upper rotating shaft and a ball head center of the fourth ball head rod has a length of H3; and a connecting line L4 between a rotating center of the lower rotating shaft and a ball head center of the fifth ball head rod has a length of H4, where H4=H3=H; where
  L1 is parallel to L3 and L4 located on the same side; and
  L2 is parallel to L3 and L4 located on the same side.

The present disclosure also provides a vehicle, including the suspension. The vehicle further includes:
  a vehicle body connected to the auxiliary frame;
  a steering member connected to the connecting portion; and
  two wheels corresponding to the two steering assemblies, where the wheels each include:
  a rim connected to the steering assembly; and
  a tire mounted on the rim.

Preferably, an accommodating tank is provided in the rim; and
  the steering assembly are each provided with:
  a steering mounting hole connected to the second end of the first steering linkage or the second end of the second steering linkage;
  an upper mounting hole connected to the second end of the upper swing arm; and
  a lower mounting hole connected to the second end of the lower swing arm; where
  the steering mounting hole, the upper mounting hole, and the lower mounting hole are located in the accommodating tank.

Preferably, an included angle formed between a connecting line of the upper mounting hole and the lower mounting hole and a forward direction of the vehicle is an obtuse angle.

Preferably, the rim is detachably connected to the steering assembly.

The beneficial effects brought by one aspect of the present disclosure are as follows:

During use, an included angle formed between a connecting line of a ball head center of the first ball head rod and a ball head center of the second ball head rod, and a connecting line of a rotating center of the steering rotating shaft and a ball head center of the third ball head rod, namely two dashed lines in the figure is a3. Regardless of turning left or right, even if the included angle a3 changes, due to the arrangement of the first ball head rod, the first steering linkage can rotate flexibly, so that no acting force on the support member is formed, no steering resistance is generated, and steering can be easily implemented.

DETAILED DESCRIPTION OF THE EMBODIMENTS

Figure 1:
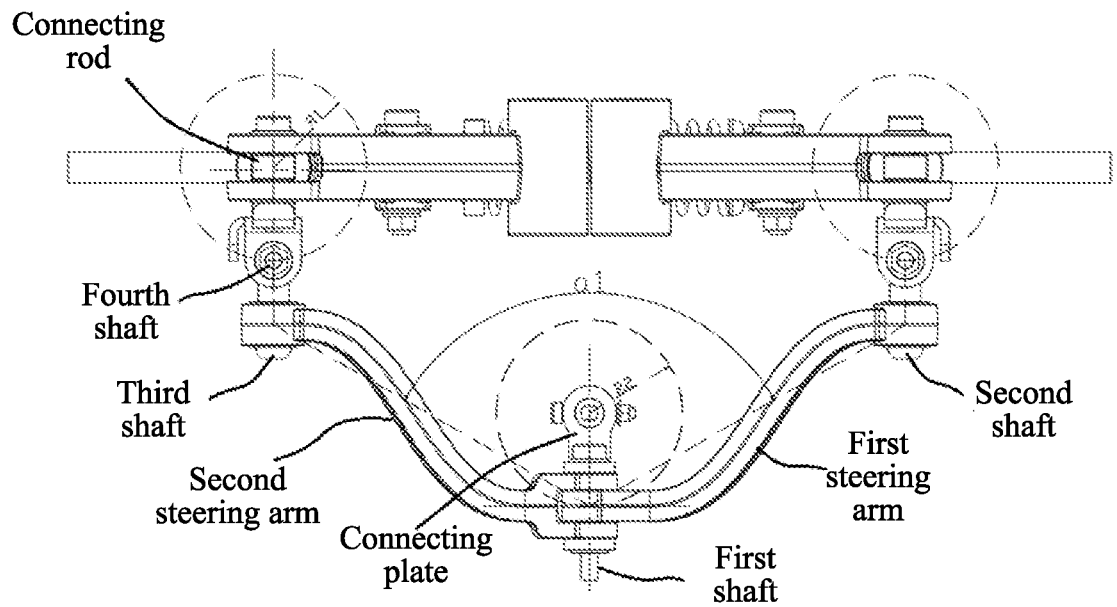
FIG. 1 is a bottom view according to the prior art.

In the description of the present disclosure, it should be understood that orientations or position relationships indicated by terms "upper", "lower", "front", "rear", "left", "right", are orientations or position relationships as shown in the drawings, and these terms are just used to facilitate description of the present disclosure and simplify the description, but not to indicate or imply that the mentioned apparatus or elements must have a specific orientation and must be established and operated in a specific orientation, and thus, these terms cannot be understood as a limitation to the present disclosure. Moreover, terms such as "first" and "second" are merely intended for the purpose of description, and should not be construed as indicating or implying relative importance.

Description: For the convenience of illustration, FIGS. 25, 27, 29, 31, 33, 34, and 36 are sectional views of a rim and a tire.

Application Overview:

In combination with FIG. 1 to FIG. 6, for the patent previously filed by the applicant, namely Chinese Patent Application No. 202122238429.2, the applicant found in the follow-up research that this art still has some shortcomings.

Figure 2:
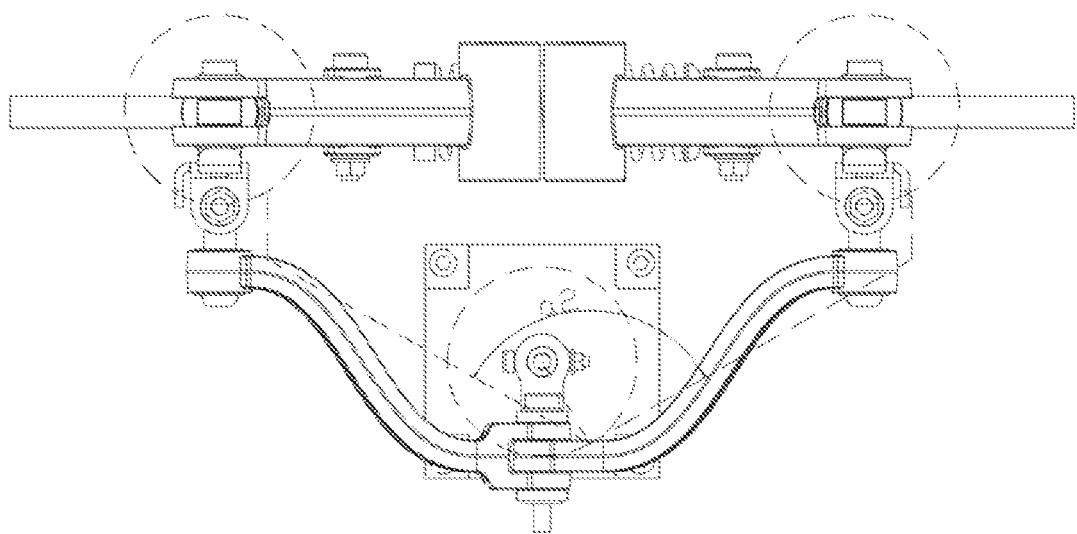
FIG. 2 is a bottom view according to the prior art.

FIG. 1 and FIG. 2 are top views of components such as a first steering arm, a second steering arm, a first cantilever, and a second cantilever.

In FIG. 1, both ends of the first steering arm are rotatably connected to a first shaft and a second shaft, and both ends of the second steering arm are rotatably connected to the first shaft and a third shaft. The third shaft is rotatably connected to a fourth shaft.

A connecting line of both ends of the first steering arm and a connecting line of both ends of the second steering arm form an included angle a1, namely an included angle formed by two long dashed lines in FIG. 1.

When a steering rod is configured to drive a connecting plate to rotate, such as turning left, as shown in FIG. 2, two long dashed lines are shown in the figure, and an included angle formed thereby is a2. At present, R1 and R2 in products on the market are not equal, which results in that a2 and a1 are not equal. R1 represents a rotating radius of the fourth shaft around a connecting rod; and R2 represents a rotating radius of the connecting plate.

Since both ends of the first steering arm and both ends of the second steering arm are connected by shafts, they can only rotate around the corresponding shafts. In combination with FIG. 1 and FIG. 2, a2 and a1 are not equal, this requires the first steering arm and the second steering arm to expand outwardly or contract inwardly, so that the first steering arm and the second steering arm are deformed, and the first shaft is suffered from an acting force applied by the first steering arm and the second steering arm, thereby preventing the connecting plate and the steering rod from rotating, increasing the rotation resistance, and resulting in inconvenient rotation.

Even if R1 and R2 are made equal, to construct a steering trapezoid, the third shaft and the second shaft need to form an included angle during rotation, and the included angle a1 formed by the two long dashed lines still changes, so that the first steering arm and the second steering arm are deformed, thereby increasing the steering resistance, and resulting in inconvenient rotation.

Figure 3:
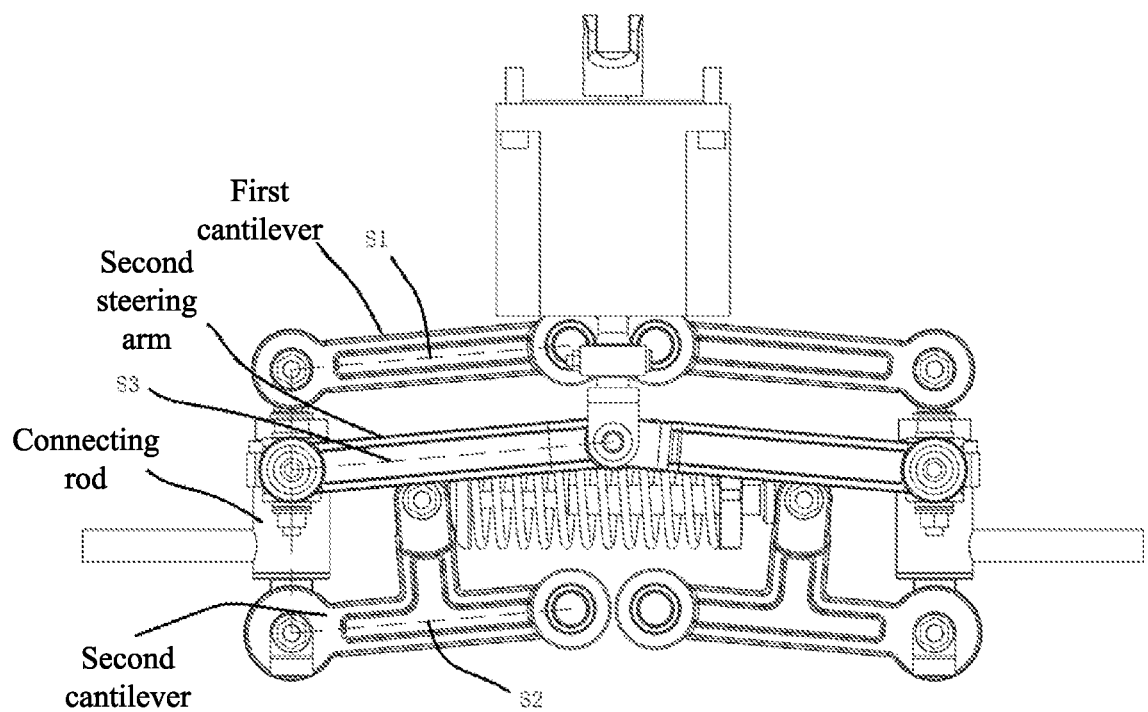
FIG. 3 is a rear view according to the prior art.
Figure 5:
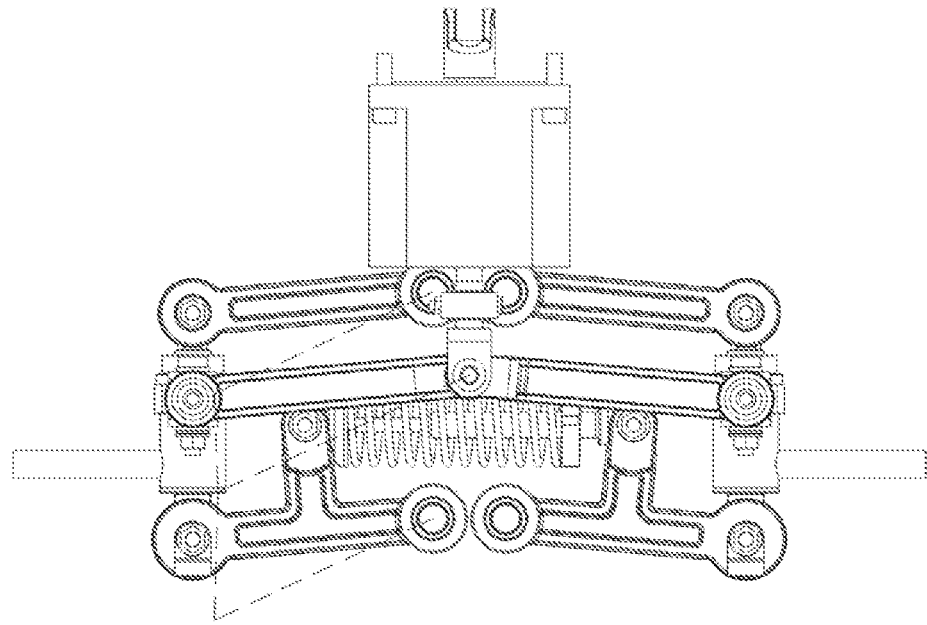
FIG. 5 is a rear view according to the prior art.

FIG. 3 and FIG. 5 are rear views of components such as a first cantilever, a second cantilever, a first steering arm, and a second steering arm.

S1 represents a connecting line of rotating centers at both ends of the first cantilever, S2 represents a connecting line of rotating centers at both ends of the second cantilever, and S3 represents a connecting line of rotating centers at both ends of the second steering arm.

In this prior art, the lengths of S1 and S2 are equal, but not equal to the length of S3.

Figure 4:
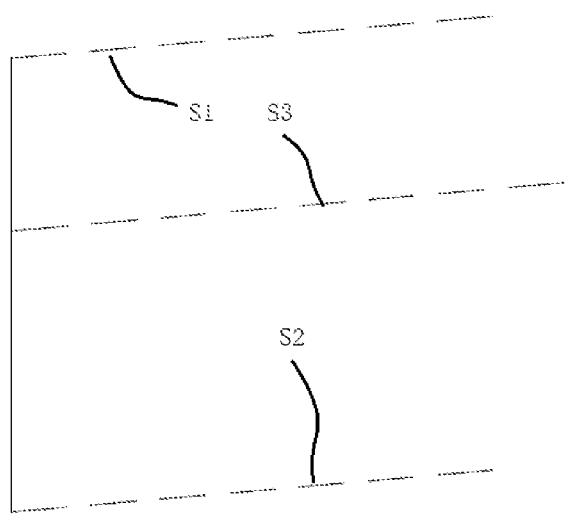
FIG. 4 is a schematic diagram of S1, S2, and S3 in FIG. 3.

In combination with FIG. 3 and FIG. 4, in the state of FIG. 3, a connecting line of the connected ends of the second steering arm, the first cantilever, the second cantilever, and the connecting rod is a straight line, as shown in FIG. 4.

Figure 6:
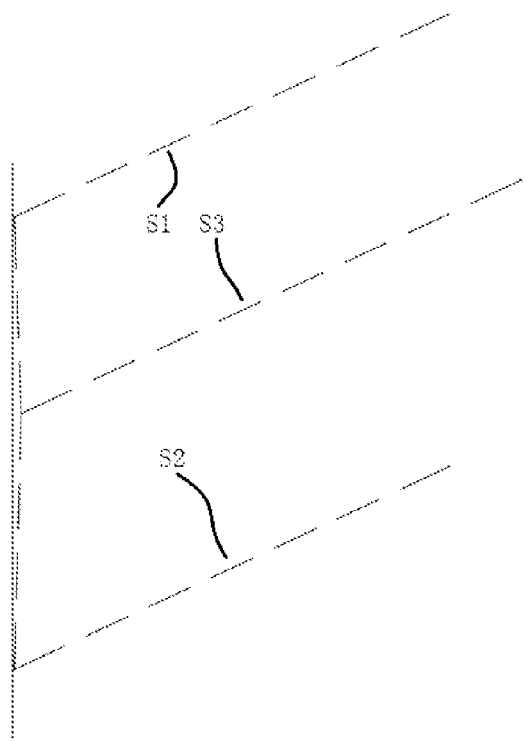
FIG. 6 is a schematic diagram of S1, S2, and S3 in FIG. 5.

When the second steering arm, the first cantilever, and the second cantilever rotate downwards, in combination with FIG. 5 and FIG. 6, the connecting line of the connected ends of the second steering arm, the first cantilever, the second cantilever, and the connecting rod is not a straight line anymore, but a triangle. After analysis, when the second steering arm, the first cantilever, and the second cantilever rotate upwards, the connecting line of the connected ends of the second steering arm, the first cantilever, the second cantilever, and the connecting rod is not a straight line anymore, either. That is, during raising and lowering of wheels, the wheels swing back and forth in the vertical direction driven by the second steering arm and the first steering arm, and the wheels cannot always maintain the current angle, resulting in poor tracking when the vehicle is running.

The applicant has found through research that the design of the first steering arm and the second steering arm is very important. In view of this, the present disclosure is filed to expect to solve at least one of the above technical problems.

Embodiment 1: referring to FIG. 7 to FIG. 24, the steering linkage assembly provided by the present disclosure includes:

a support member 1, a connecting portion 2, a first steering linkage 3, and a second steering linkage 6. The connecting portion 2 is rotatably arranged on the support member 1 and connected to an external steering member. The steering member may be a steering rod or a flat shaft on a motor 20, which can drive the connecting portion 2 to rotate during use.

A first ball head rod 4 is provided with one end connected to a ball head at a first end of the first steering linkage 3 and the other end connected to the support member 1.

A steering rotating shaft 7 is mounted at a first end of the second steering linkage 6 and rotatably connected to the support member 1. A rotating centerline of the steering rotating shaft 7 is not parallel to a rotating centerline of the connecting portion 2. In this embodiment, they may be perpendicular to each other.

Figure 9:
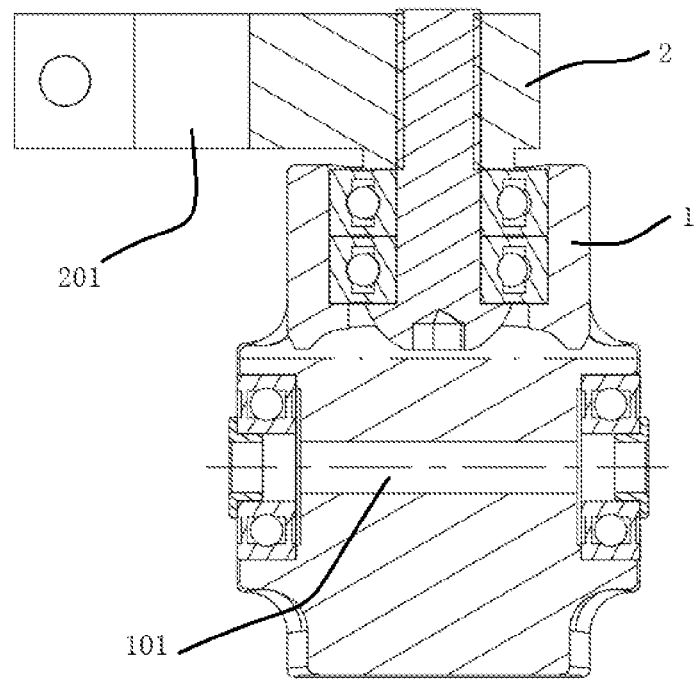
FIG. 9 is a sectional view of a support member in Embodiment 1 according to the present disclosure.

The connecting portion 2 is rotatably connected to the support member 1 through a bearing, as shown in FIG. 9, the connecting portion 2 can rotate around the vertical direction.

Figure 8:
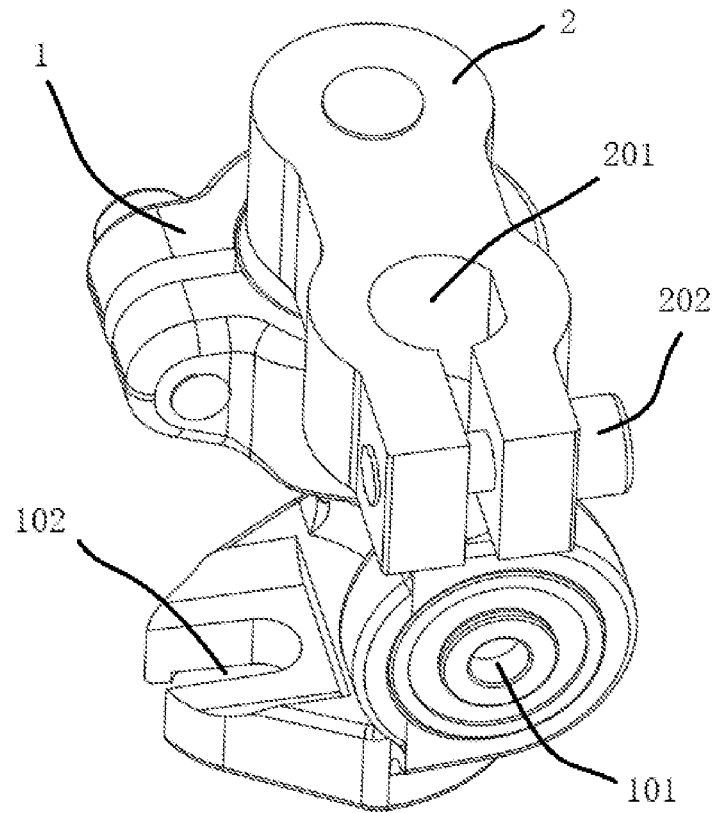
FIG. 8 is an axis view of a support member in Embodiment 1 according to the present disclosure.

In combination with FIG. 8, a flat shaft mounting hole 201 can be provided on the connecting portion 2, which may be connected to a flat shaft on the motor 20 or connected to a steering rod. Then, a fastening screw 202 is configured to perform fixing.

Figure 10:
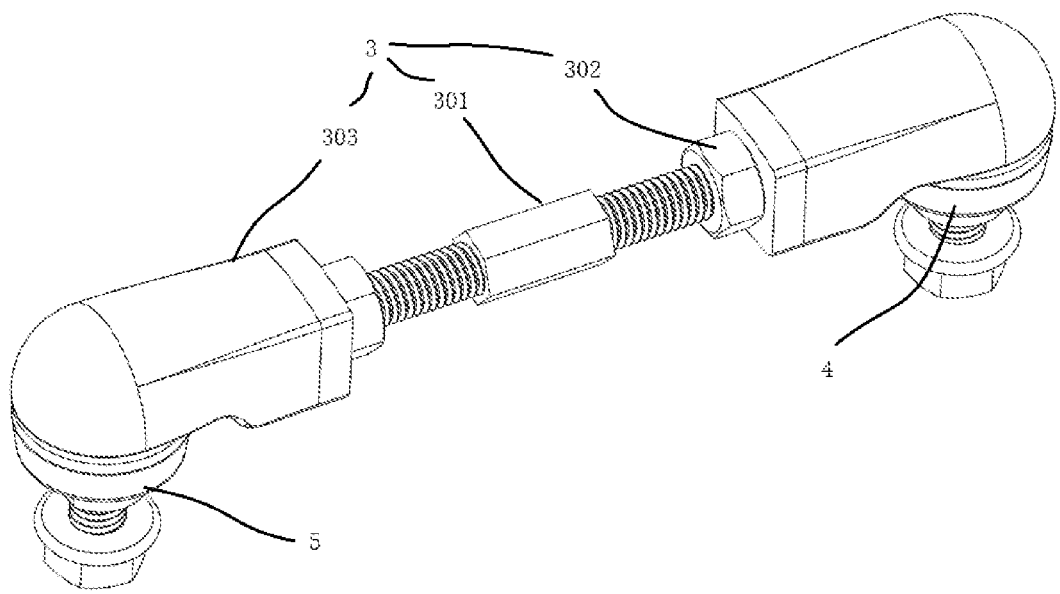
FIG. 10 is a schematic diagram of a first steering linkage in Embodiment 1 according to the present disclosure.
Figure 11:
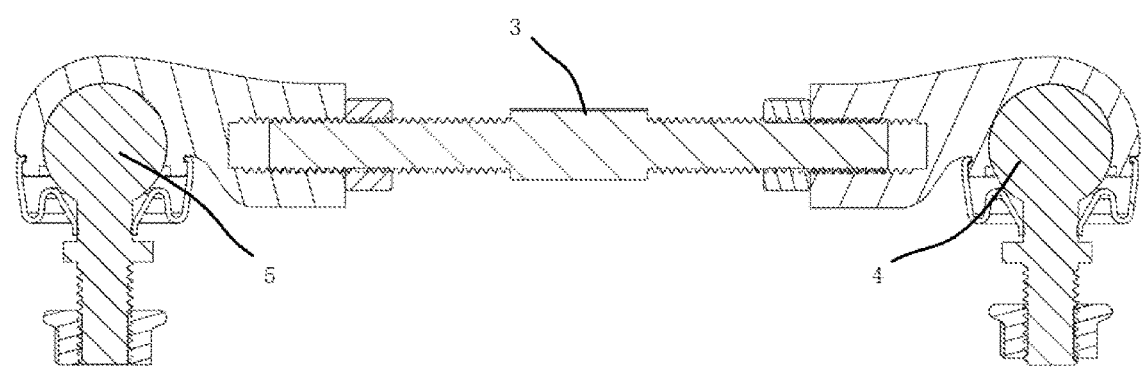
FIG. 11 is a sectional view of a first steering linkage in Embodiment 1 according to the present disclosure.

In combination with FIG. 10 and FIG. 11, the first steering linkage 3 may include a double-ended positive and negative thread rod 301, two nuts 302, and two joint bearings 303. Other structures can also be used, of course.

The first ball head rod 4 is connected to a ball head of a joint bearing.

Figure 12:
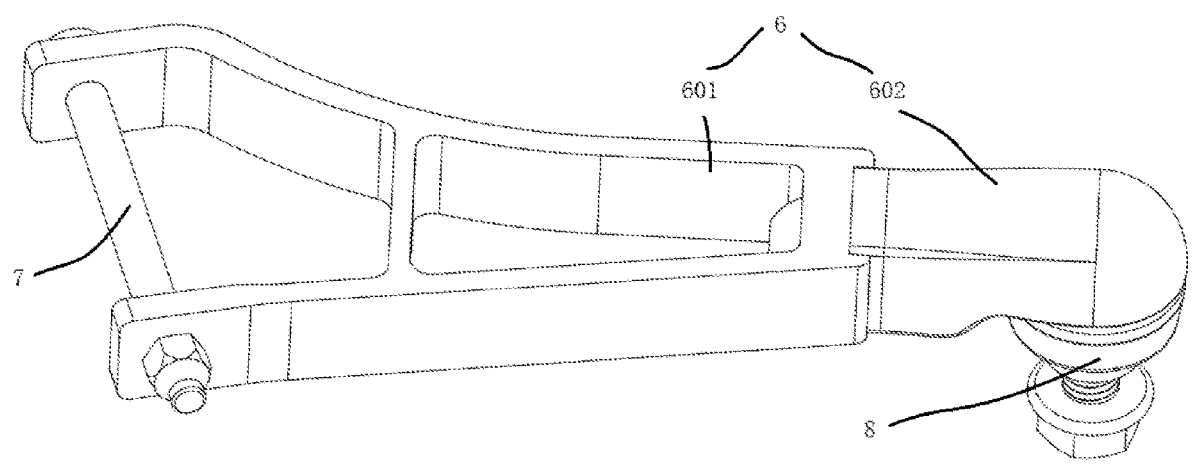
FIG. 12 is a schematic diagram of a second steering linkage in Embodiment 1 according to the present disclosure.
Figure 13:
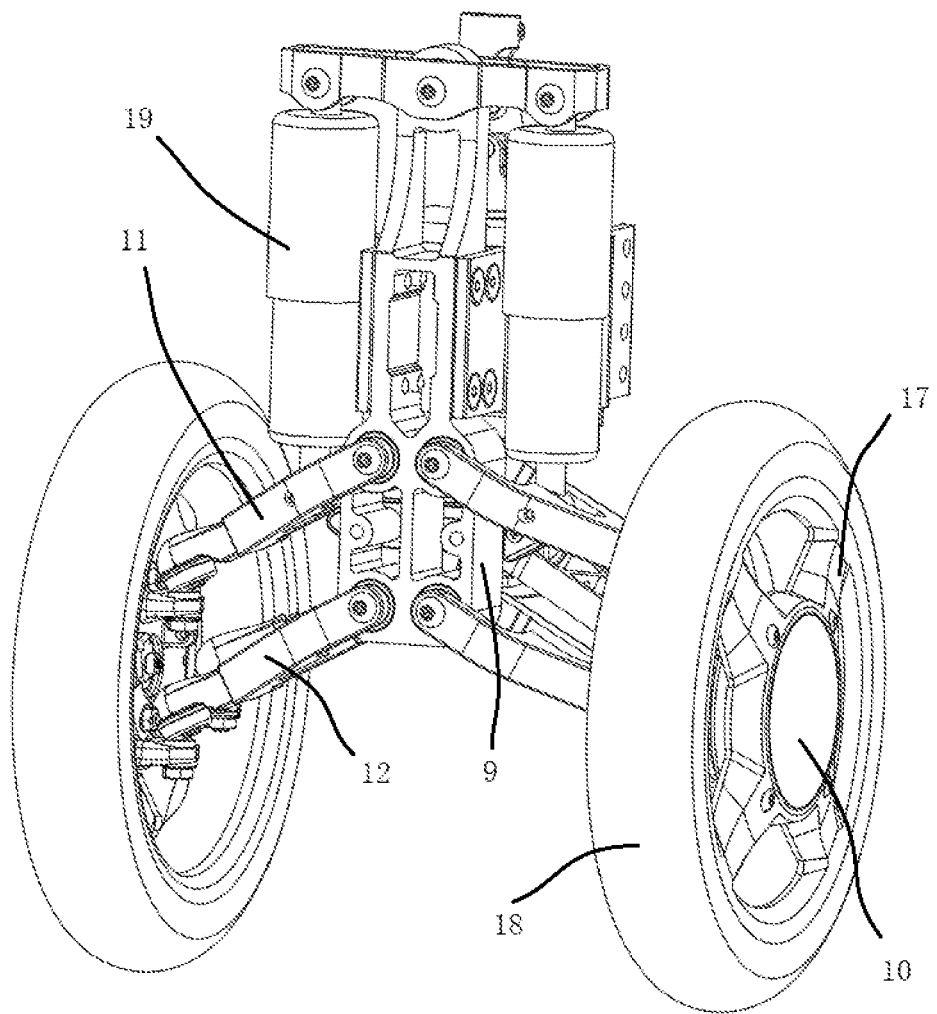
FIG. 13 is an axis view of related components in Embodiments 1, 2, and 3 according to the present disclosure.
Figure 14:
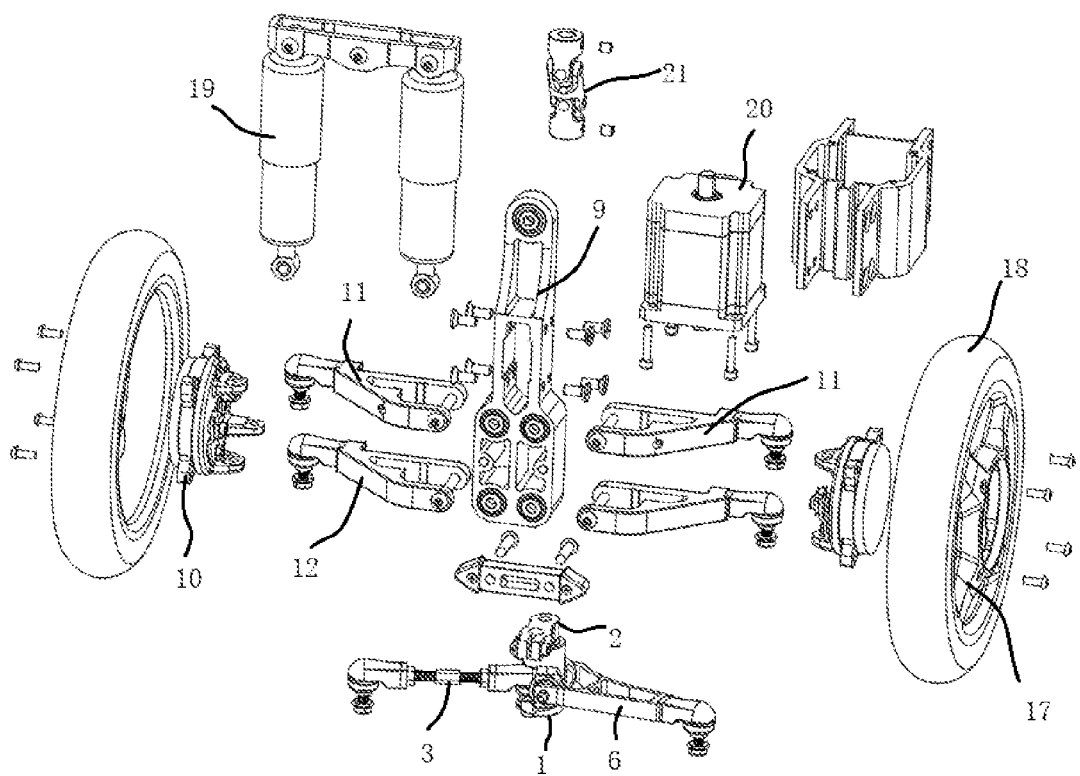
FIG. 14 is an exploded view of related components in Embodiments 1, 2, and 3 according to the present disclosure.
Figure 15:
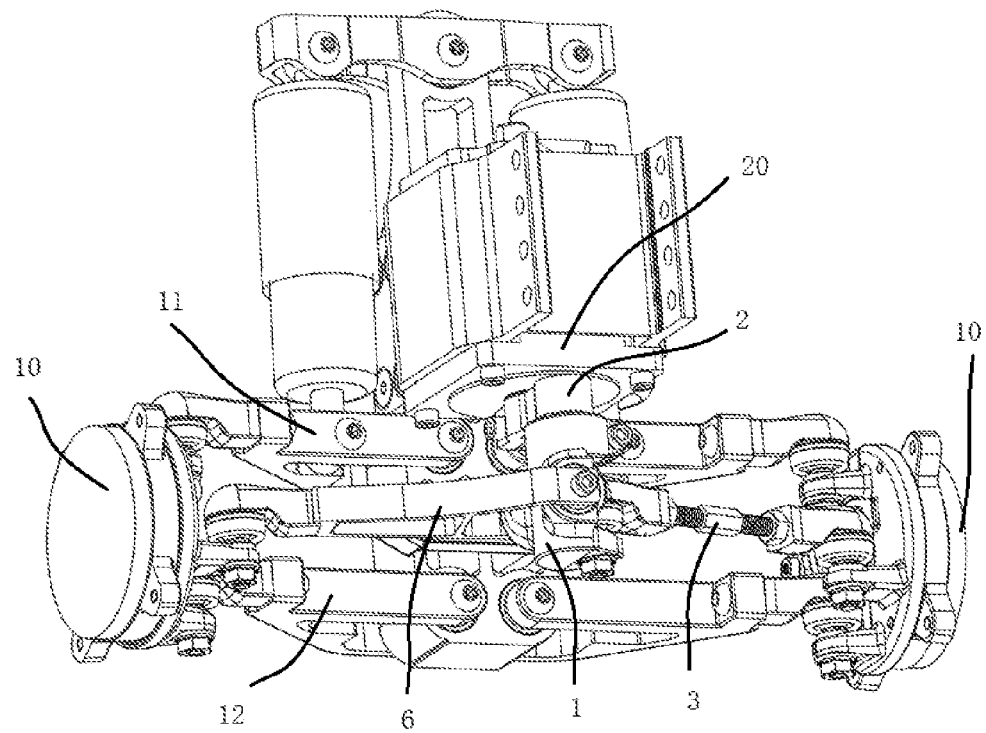
FIG. 15 is an axis view of Embodiments 1 and 2 according to the present disclosure.
Figure 16:
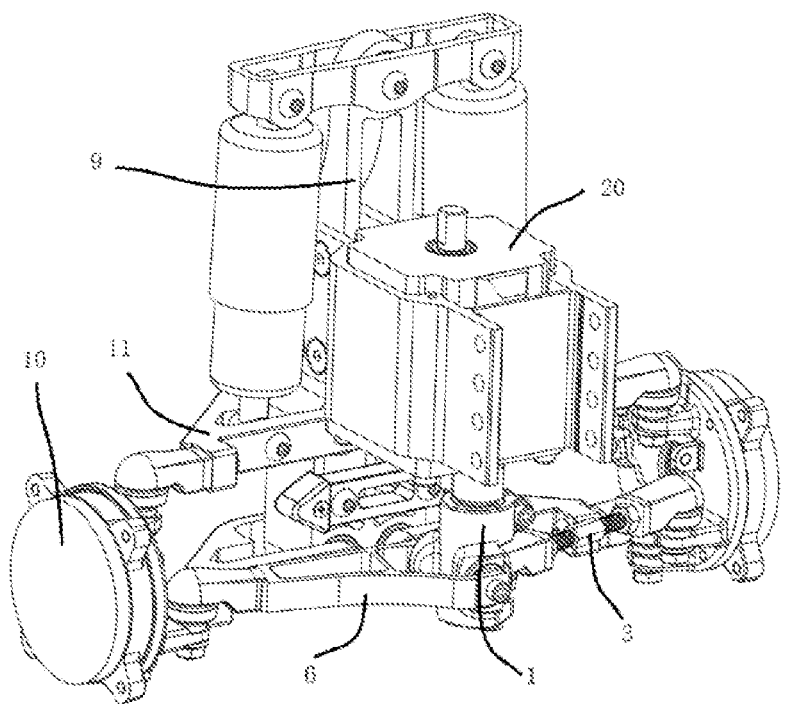
FIG. 16 is an axis view of Embodiments 1 and 2 according to the present disclosure.
Figure 17:
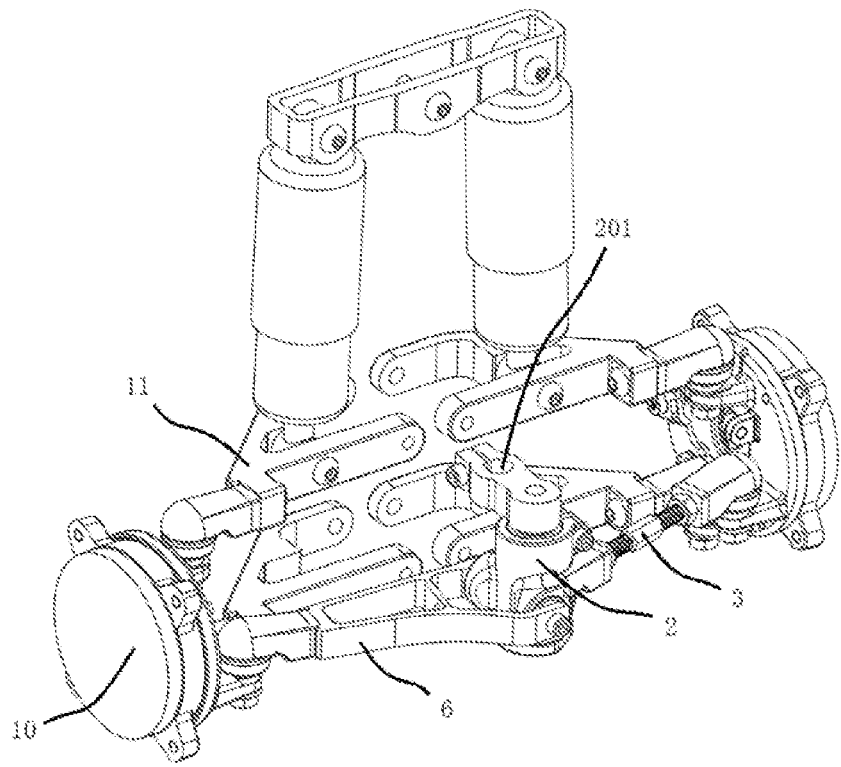
FIG. 17 is an axis view of some components in Embodiments 1 and 2 according to the present disclosure.
Figure 18:
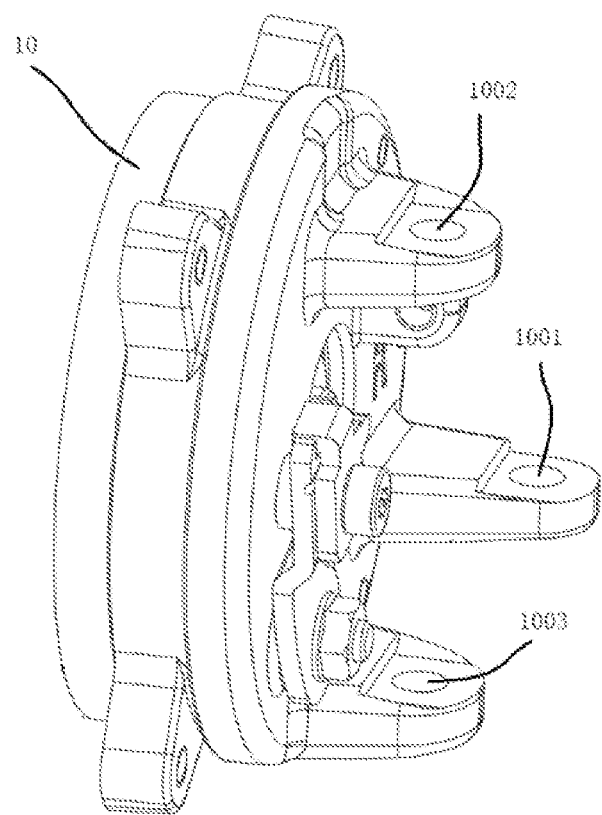
FIG. 18 is a schematic diagram of a steering assembly in Embodiments 1 and 2 according to the present disclosure.
Figure 19:
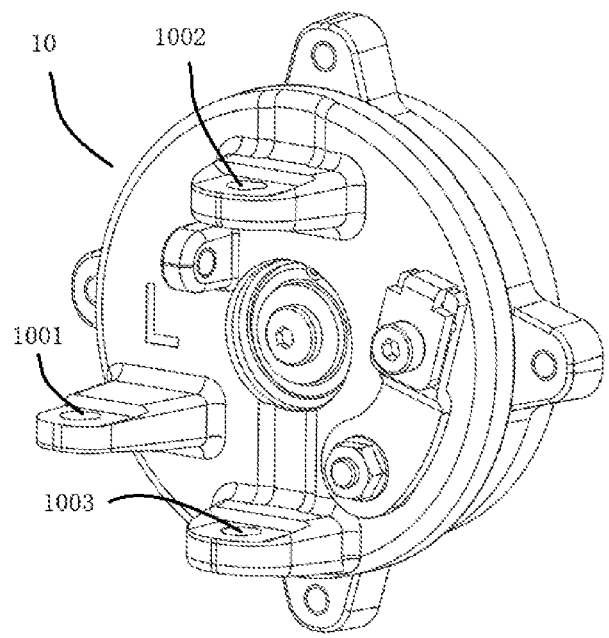
FIG. 19 is a schematic diagram of a steering assembly in Embodiments 1 and 2 according to the present disclosure.
Figure 20:
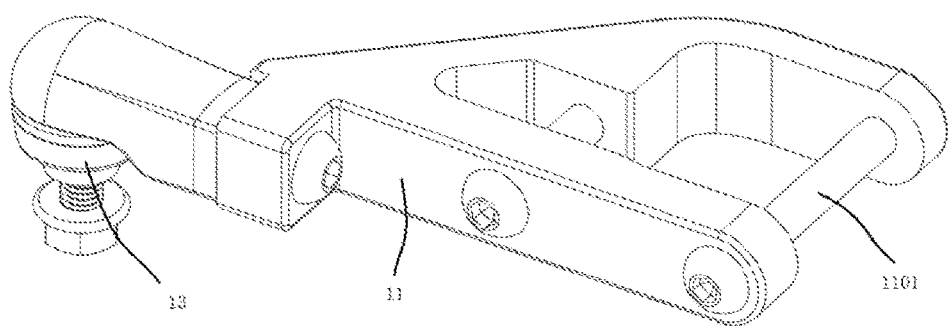
FIG. 20 is a schematic diagram of an upper swing arm in Embodiments 1 and 2 according to the present disclosure.
Figure 21:
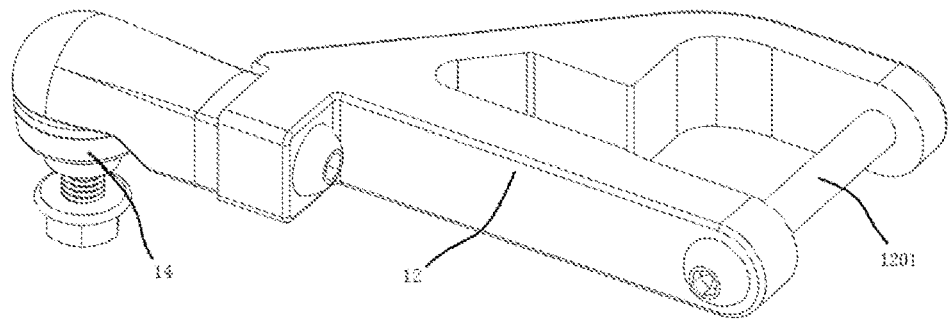
FIG. 21 is a schematic diagram of a lower swing arm in Embodiments 1 and 2 according to the present disclosure.

In combination with FIG. 12, the second steering linkage 6 may include a body 601 and a joint bearing 602 connected to the body.

In combination with FIG. 8, a mounting hole 101 and a gap 102 can be provided on the support member 1, and the mounting hole 101 in FIG. 8 can be arranged horizontally.

The steering rotating shaft 7 can be located in the mounting hole 101. The first ball head rod 4 is connected to the gap 102.

To further improve the flexibility, the assembly further includes:

a second ball head rod 5 provided with one end connected to a ball head at a second end of the first steering linkage 3; and a third ball head rod 8 provided with one end connected to a ball head at a second end of the second steering linkage 6.

Furthermore, a connecting line L1 between a ball head center of the first ball head rod 4 and a ball head center of the second ball head rod 5 has a length of H1; and a connecting line L2 between a rotating center of the steering rotating shaft 7 and a ball head center of the third ball head rod 8 has a length of H2, where H2=H1=H.

Figure 7:
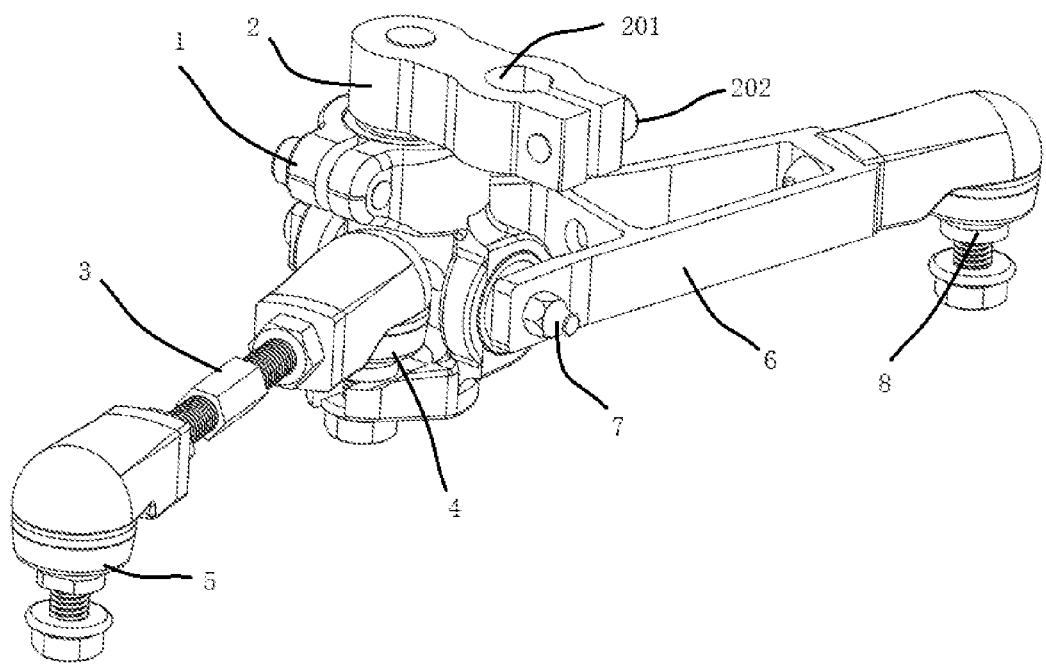
FIG. 7 is an axis view of Embodiment 1 according to the present disclosure.

In combination with FIG. 7, in this embodiment, the first steering linkage 3 is connected to the support member 1 through the first ball head rod 4, and can flexibly rotate relative to the support member 1. The second steering linkage 6 is connected to the support member 1 through the steering rotating shaft 7, and can rotate relative to the support member 1.

Figure 22:
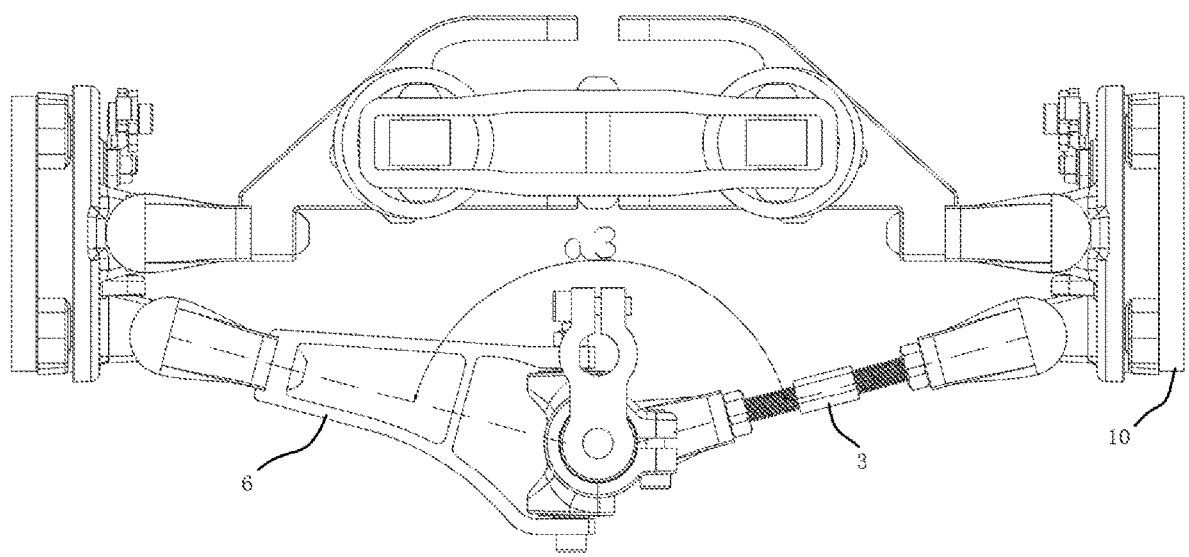
FIG. 22 is a top view of some components in Embodiments 1 and 2 according to the present disclosure.
Figure 23:
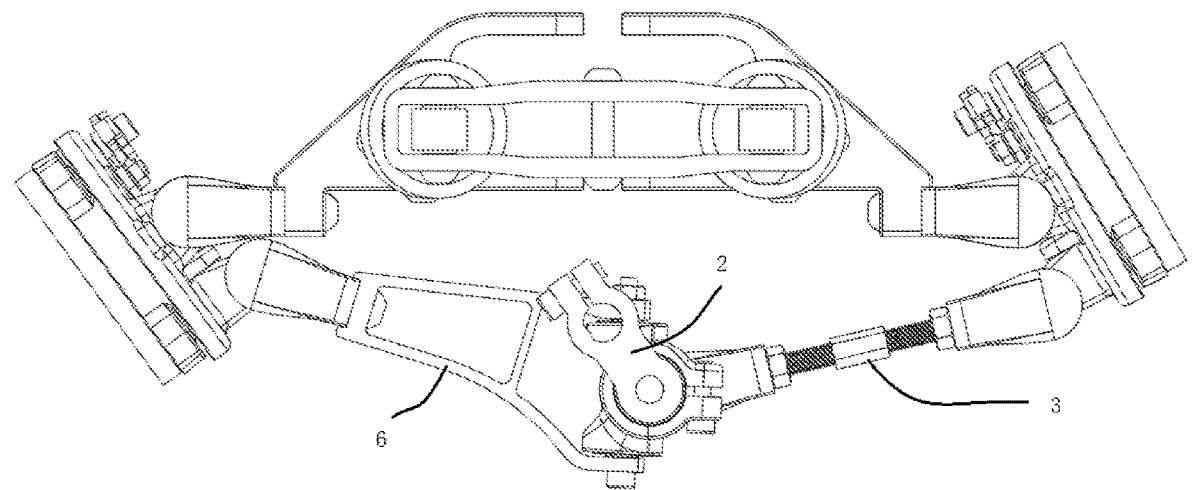
FIG. 23 is a top view of some components when turning left in Embodiments 1 and 2 according to the present disclosure.
Figure 24:
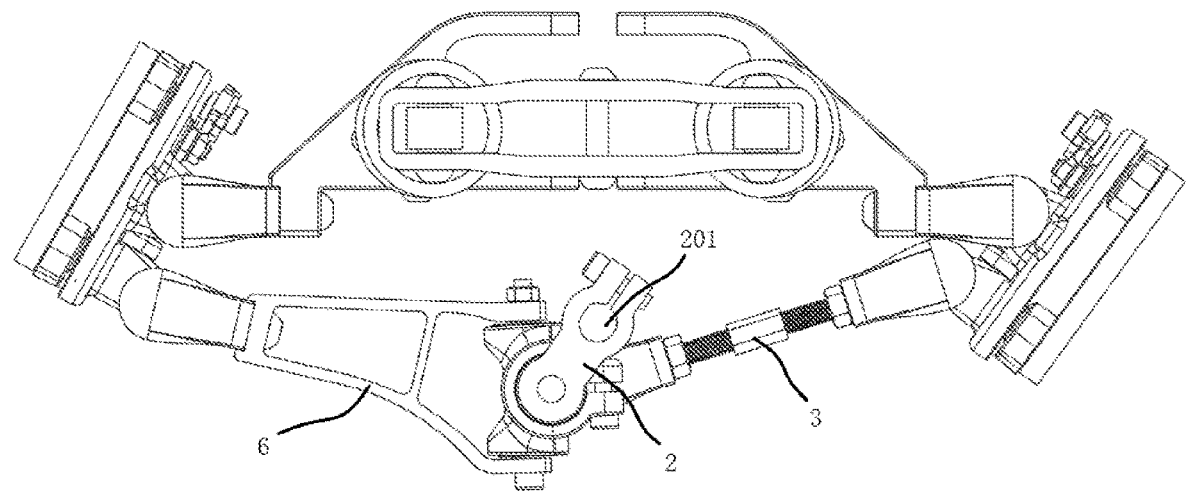
FIG. 24 is a top view of some components when turning right in Embodiments 1 and 2 according to the present disclosure.

During use, in combination with FIG. 22, an included angle formed between a connecting line of a ball head center of the first ball head rod 4 and a ball head center of the second ball head rod 5, and a connecting line of a rotating center of the steering rotating shaft 7 and a ball head center of the third ball head rod 8, namely two dashed lines in the figure is a3. In combination with FIGS. 23 and 24, regardless of turning left or right, even if the included angle a3 changes, due to the arrangement of the first ball head rod 4, the first steering linkage 3 can rotate flexibly, so that no acting force on the support member 1 and the connecting portion 2 is formed, no steering resistance is generated, and steering can be easily implemented.

By turning a handlebar, the user drives the connecting portion 2 to rotate through the steering rod or the motor 20.

Since the rotating centerline of the steering rotating shaft 7 is perpendicular to the rotating centerline of the connecting portion 2, the support member 1 is limited by the second steering linkage 6 and the steering rotating shaft 7, and the support member 1 can rotate around the flat shaft mounting hole 201 while maintaining the relative positional relationship between the first steering linkage 3 and the second steering linkage 6, so that the relative positions of the second ball head rod 5 and the third ball head rod 8 are basically stable and similar to translational movement, the rotational movement of turning the handlebar is converted into similar translational movement of the first steering linkage 3 and the second steering linkage 6, which helps to construct a steering trapezoid.

Embodiment 2: in combination with FIG. 13 to FIG. 36, a suspension includes:
- an auxiliary frame 9; two steering assemblies 10 symmetrically arranged on both sides of the auxiliary frame 9, where each steering assembly 10 is provided with a steering mounting hole 1001, an upper mounting hole 1002, and a lower mounting hole 1003, and the upper mounting hole 1002 and the lower mounting hole 1003 are coaxial; and
- two swing arm assemblies distributed symmetrically, where the swing arm assemblies each include:
- an upper swing arm 11 having a first end provided with an upper rotating shaft 1101 and a second end movably connected to the steering assembly 10, where the upper rotating shaft 1101 is rotatably connected to the auxiliary frame 9; a lower swing arm 12 having a first end provided with a lower rotating shaft 1201 and a second end movably connected to the steering assembly 10, where the lower rotating shaft 1201 is rotatably connected to the auxiliary frame 9; and
- the steering linkage assembly, where
- the second end of the first steering linkage 3 is connected to the steering mounting hole 1001 through a second ball head rod 5; the second end of the second steering linkage 6 is connected to the steering mounting hole 1001 through a third ball head rod 8;
- the second end of the upper swing arm 11 is connected to the upper mounting hole 1002 through a fourth ball head rod 13; and the second end of the lower swing arm 12 is connected to the lower mounting hole 1003 through a fifth ball head rod 14.

Compared with the patent previously applied by the applicant, the steering linkage assembly in this embodiment adopts the structure of Embodiment 1.

In combination with FIG. 22, the included angle formed by the connecting line of two dashed lines in the figure is a3. In combination with FIG. 23 and FIG. 24, regardless of turning left or right, although the included angle a3 changes, but due to the arrangement of the first ball head rod 4, the first steering linkage 3 can rotate flexibly, and the first steering linkage 3 and the second steering linkage 6 can freely expand outwardly and retract inwardly to change the included angle a3, so that no acting force on the support member 1 and the connecting portion 2 is formed, no steering resistance is generated, and steering can be easily implemented.

By turning a handlebar and a universal joint 21, the user drives the connecting portion 2 to rotate through the steering rod or the motor 20. Since the rotating centerline of the steering rotating shaft 7 is perpendicular to the rotating centerline of the connecting portion 2, the support member 1 is limited by the second steering linkage 6 and the steering rotating shaft 7, and the support member 1 can rotate around the flat shaft mounting hole 201 while maintaining the relative positional relationship between the first steering linkage 3 and the second steering linkage 6, so that the relative positions of the second ball head rod 5 and the third ball head rod 8 are basically stable and similar to translational movement, the rotational movement of turning the handlebar is converted into similar translational movement of the first steering linkage 3 and the second steering linkage 6, which helps to construct a steering trapezoid.

The steering assembly 10 in this embodiment is also different from that in the prior art. The first steering linkage 3 is connected to the steering assembly 10 through the second ball head rod 5, and the second steering linkage 6 is connected to the steering assembly 10 through the third ball head rod 8. This is also different from that in the prior art.

Of course, in another embodiment, the technology of Embodiment 1 can be directly applied to the patent previously applied by the applicant, instead of the first steering arm, the second steering arm, the connecting plate, and the connector therein.

Figure 25:
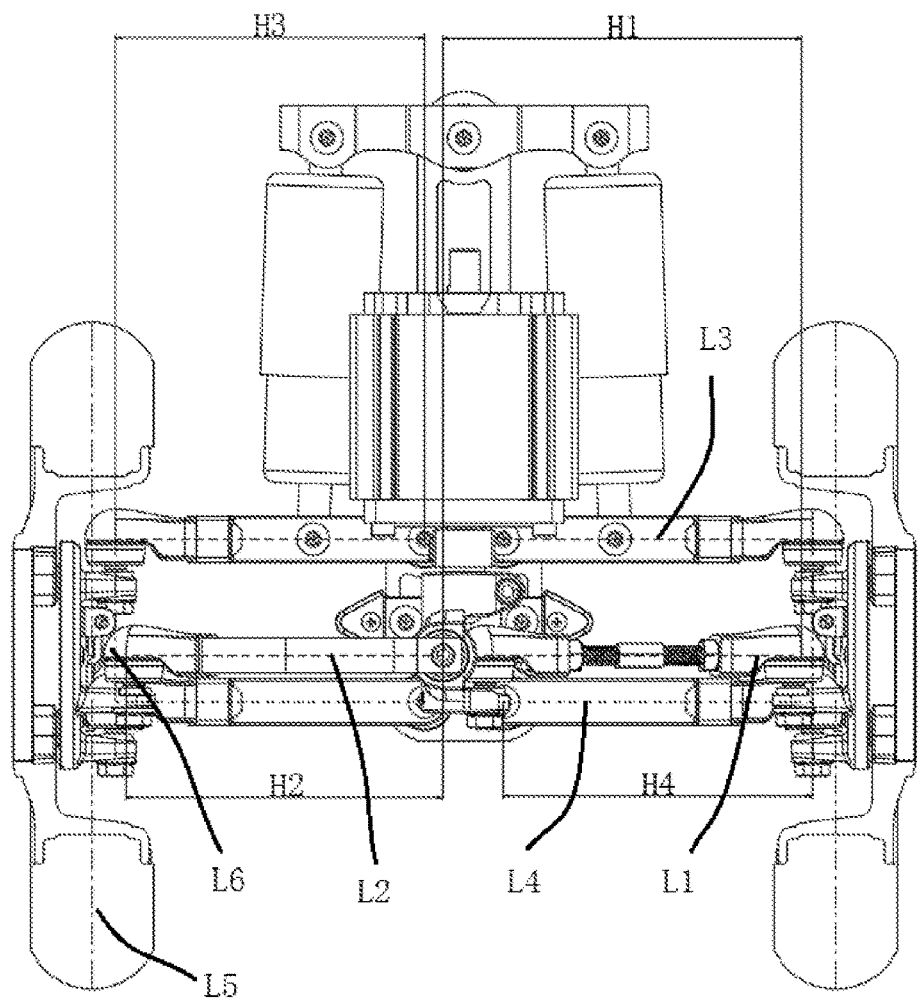
FIG. 25 is a rear view of Embodiments 2 and 3 according to the present disclosure.
Figure 26:
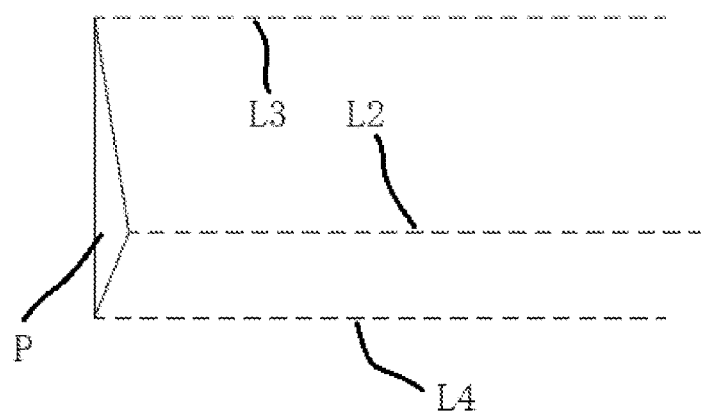
FIG. 26 is a schematic diagram of L2, L3, and L4 in FIG. 25 according to the present disclosure.

In combination with FIG. 25, furthermore, a connecting line L3 between a rotating center of the upper rotating shaft 1101 and a ball head center of the fourth ball head rod 13 has a length of H3; and a connecting line L4 between a rotating center of the lower rotating shaft 1201 and a ball head center of the fifth ball head rod 14 has a length of H4, where both H4 and H3 are equal to H1, L1 is parallel to L3 and L4 located on the same side, and L2 is parallel to L3 and L4 located on the same side.

In combination with FIG. 25 to FIG. 30, by taking the steering assembly 10 on the left as an example, the dashed lines L3, L4, and L2 are equal in length and in parallel, and the second steering linkage 6 rotates around the steering rotating shaft 7. The upper swing arm 11 rotates around the upper rotating shaft 1101, and the lower swing arm 12 rotates around the lower rotating shaft 1201.

The ball head center of the third ball head rod 8, the ball head center of the fourth ball head rod 13, and the ball head center of the fifth ball head rod 14 are connected and form a stable triangle P, so that the steering assembly 10 on the left side can always maintain the current angle when moving up and down. Similarly, the steering assembly 10 on the right side can always maintain the current angle when moving up and down. Two wheels are respectively connected to the two steering assemblies 10. Therefore, the wheels can always maintain the current angle when moving up and down, there is no situation that the wheels swing left and right when moving up and down, and the vehicle has good tracking performance.

Embodiment 3: in combination with FIG. 13, FIG. 14, and FIG. 25 to FIG. 38, the vehicle may be a scooter, which may be an inverted three-wheeled vehicle or a four-wheeled vehicle. The vehicle includes the suspension, and further includes:
- a vehicle body 15 connected to the auxiliary frame 9; a steering member connected to the connecting portion 2, where the steering joint may be a steering rod or a motor 20; and
- two wheels corresponding to the two steering assemblies 10, where the wheels each include:
- a rim 17 connected to the steering assembly 10; and a tire 18 mounted on the rim 17. The technical effect of the above suspension is achieved.

Furthermore, an accommodating tank 16 is provided in the rim 17.

The steering assembly 10 is provided with: a steering mounting hole 1001 connected to the second end of the first steering linkage 3 or the second end of the second steering linkage 6, namely the second ball head rod or the third ball head rod; an upper mounting hole 1002 connected to the second end of the upper swing arm 11, specifically connected to the fourth ball head rod; and a lower mounting hole 1003 connected to the second end of the lower swing arm 12, specifically connected to the fifth ball head rod. The steering mounting hole 1001, the upper mounting hole 1002, and the lower mounting hole 1003 are located in the accommodating tank 16. The upper mounting hole 1002 and the lower mounting hole 1003 are coaxially arranged.

Figure 27:
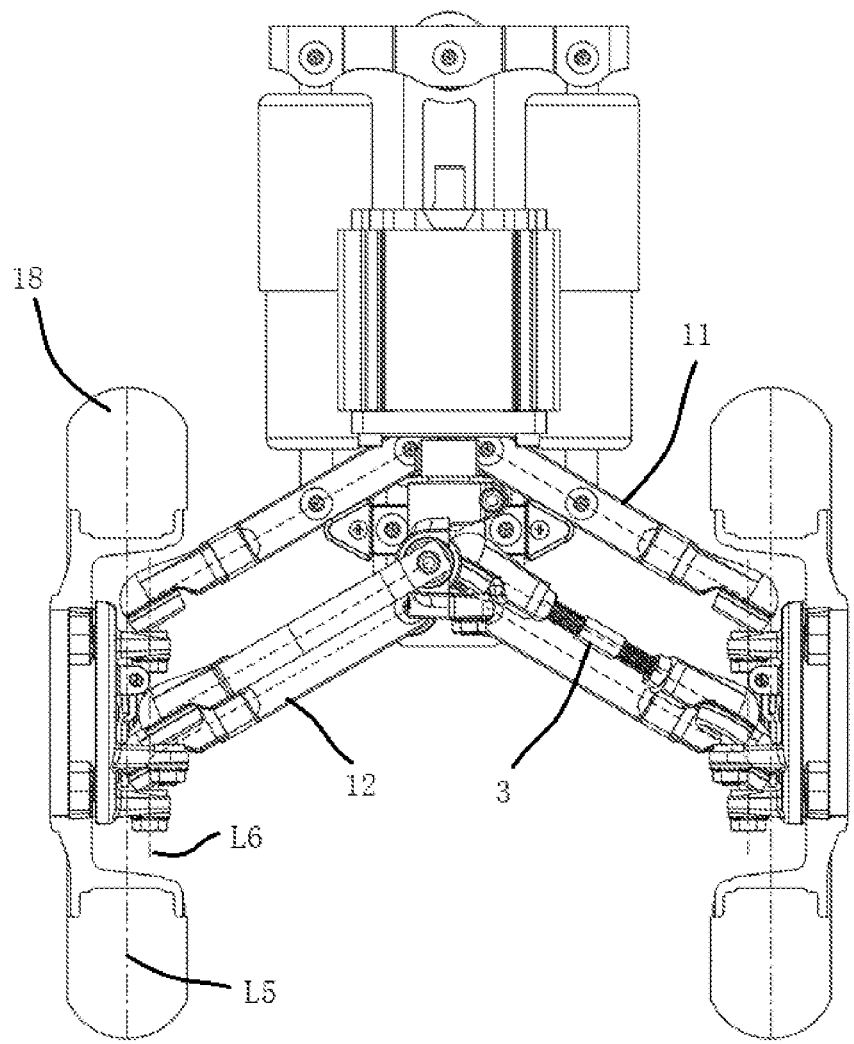
FIG. 27 is a rear view of an upper swing arm when rotating downward in Embodiments 2 and 3 according to the present disclosure.
Figure 28:
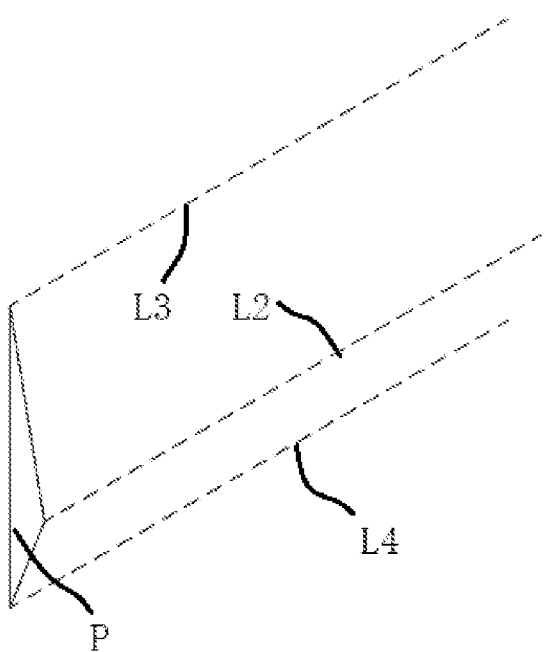
FIG. 28 is a schematic diagram of L2, L3, and L4 in FIG. 27 according to the present disclosure.
Figure 29:
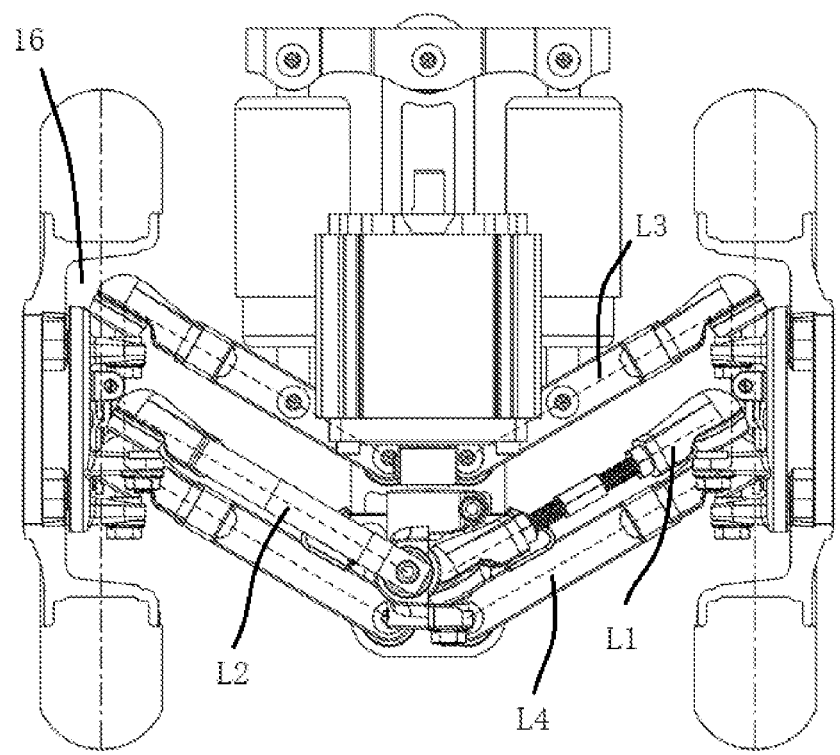
FIG. 29 is a rear view of an upper swing arm when rotating upward in Embodiments 2 and 3 according to the present disclosure.
Figure 30:
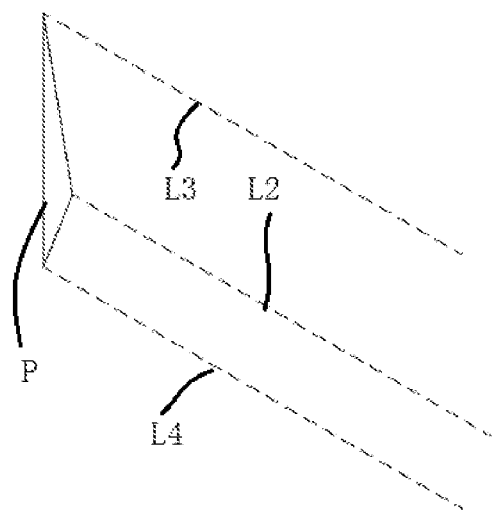
FIG. 30 is a schematic diagram of L2, L3, and L4 in FIG. 29 in Embodiments 2 and 3 according to the present disclosure.
Figure 37:
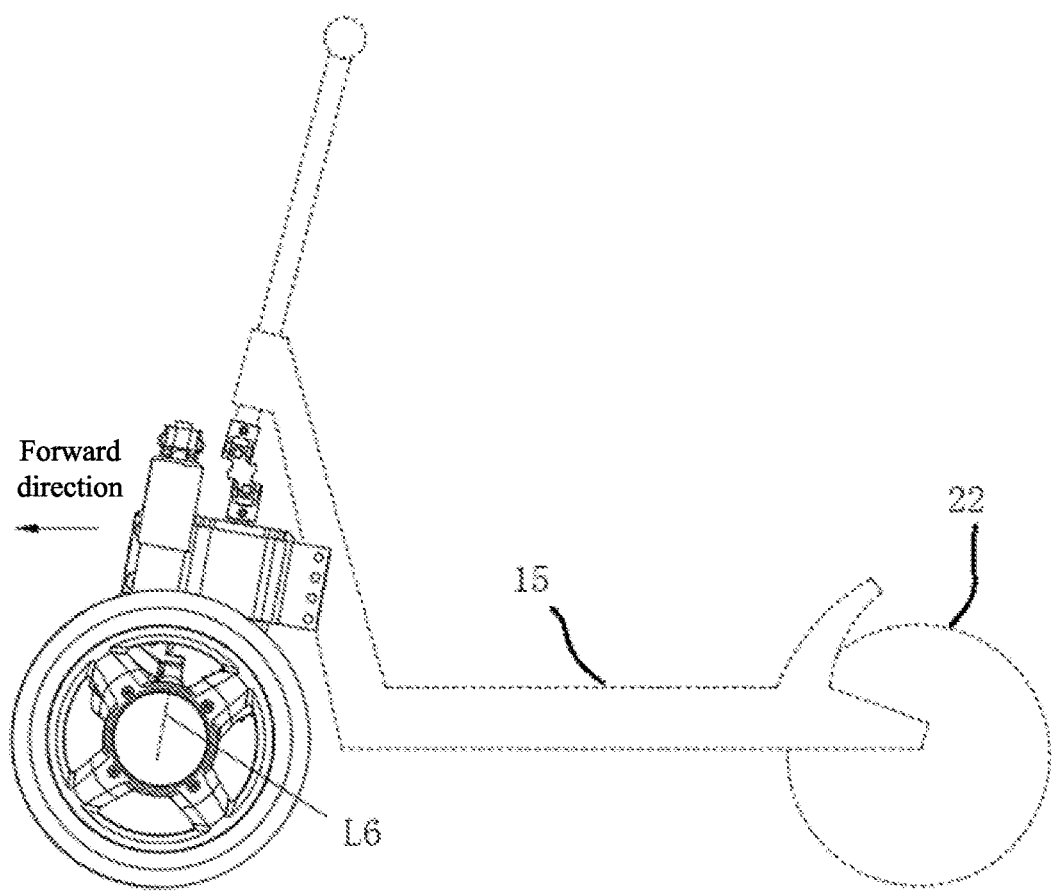
FIG. 37 is a right view of Embodiment 3 according to the present disclosure.
Figure 38:
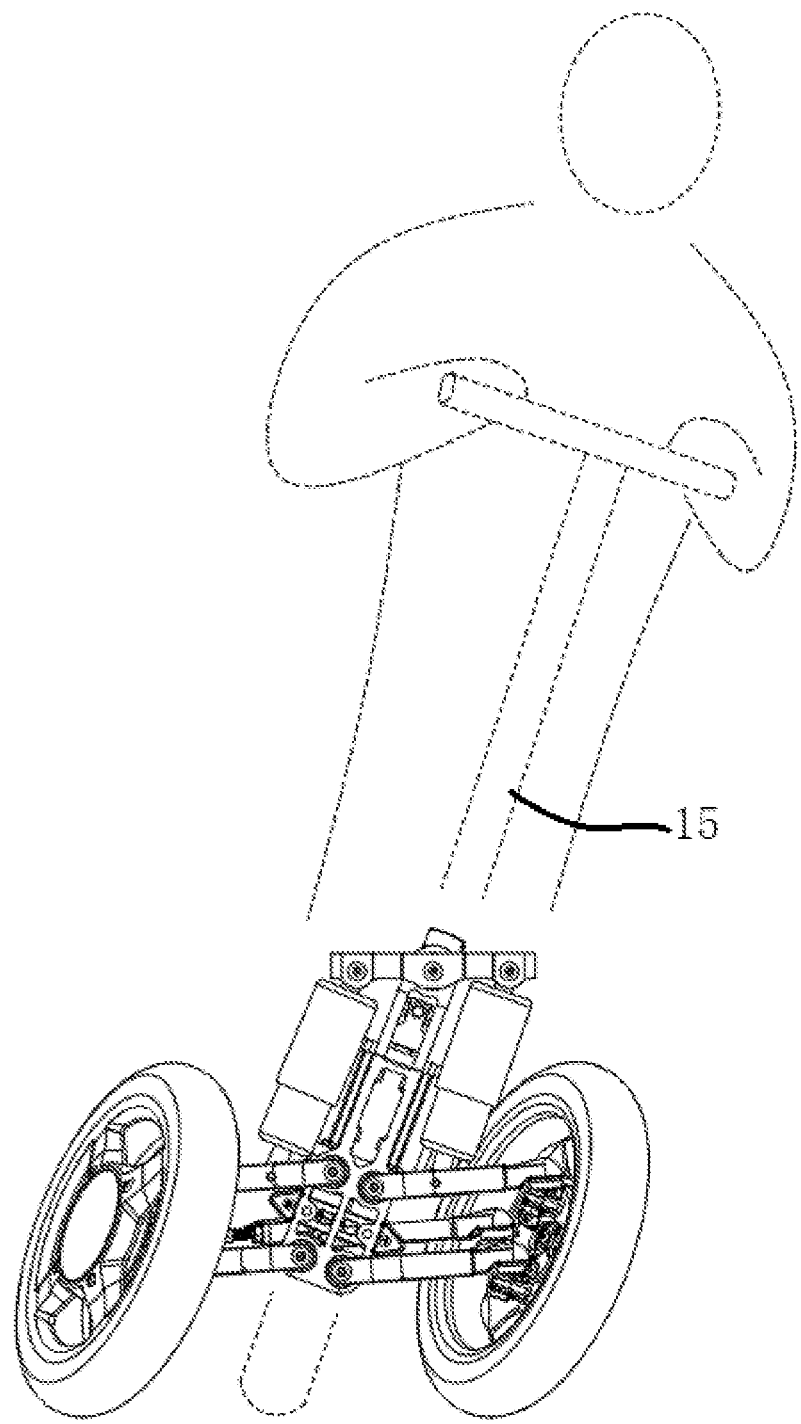
FIG. 38 is a schematic diagram of Embodiment 3 according to the present disclosure.

In combination with FIG. 27 and FIG. 37, L5 represents a vertical center line of the tire 18 passing through a ground point; and L6 represents a main pin, namely a center line of the upper mounting hole 1002 and the lower mounting hole 1003 in this embodiment.

Since the upper mounting hole 1002 and the lower mounting hole 1003 are located in the accommodating tank 16, and the distance between L5 and L6 is small, so that the resistance of the tire 18 when turning around the main pin is smaller, the resistance of the tire 18 turning around the main pin is smaller when the vehicle turns, and the vehicle steering feel is light. The patent previously filed by the applicant cannot achieve such technical effects.

Furthermore, in combination with FIG. 37, the included angle formed between a connecting line of the upper mounting hole 1002 and the lower mounting hole 1003 and a forward direction of the vehicle is an obtuse angle. With this setting, the main pin can be tilted back, so that the steering and straightening ability of the vehicle can be improved, and it is easier for the vehicle to stay upright and drive straight.

Furthermore, the rim 17 is detachably connected to the steering assembly 10. A plurality of threaded holes can be correspondingly provided on the rim 17 and the steering assembly 10, and are connected through bolts.

Due to the small size of the wheels of the existing scooter, when the tire 18 is damaged and needs to be repaired, it is difficult to remove the tire 18 and the rim 17 separately, and the tire needs to be repaired on the vehicle, which is inconvenient to maintain. However, in this embodiment, when the tire 18 is damaged and needs to be repaired, the tire 18 and the rim 17 can be separately removed only by dismounting the bolts, which is similar to an automobile and convenient to maintain and replace.

Figure 31:
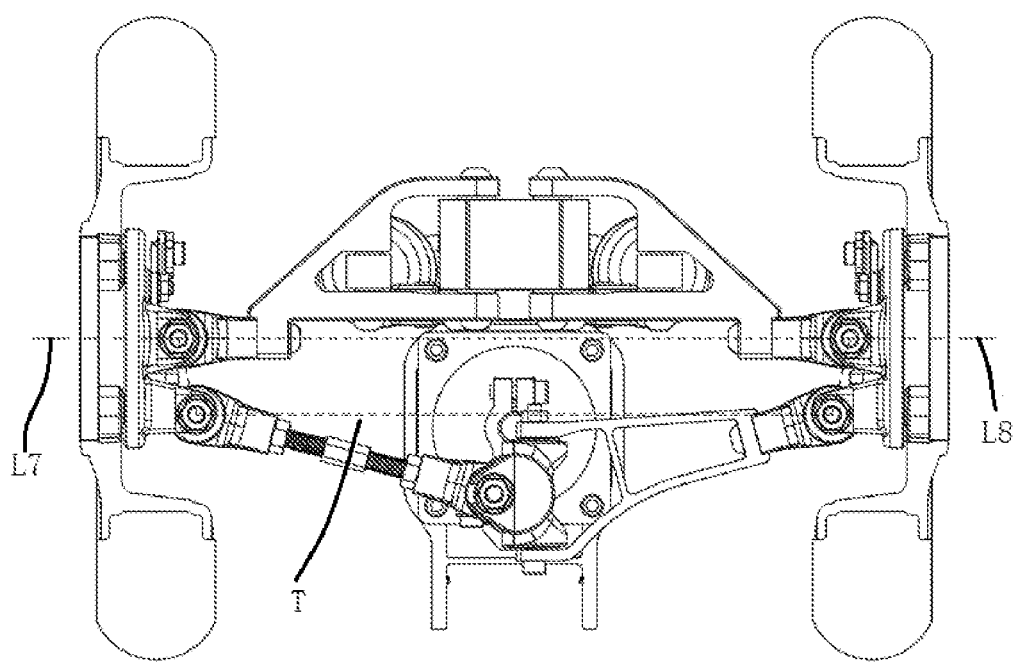
FIG. 31 is a bottom view of Embodiments 2 and 3 according to the present disclosure.
Figure 32:
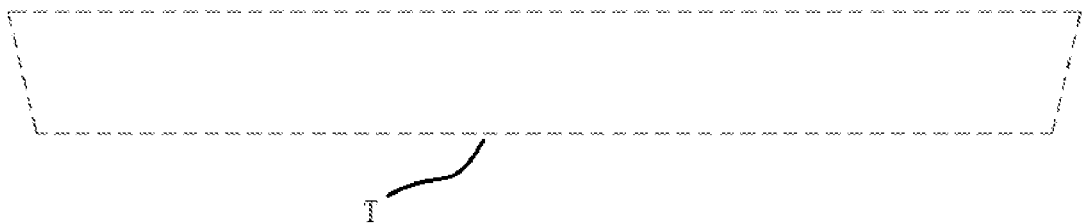
FIG. 32 is a schematic diagram of a steering trapezoid in FIG. 31 according to the present disclosure.

FIG. 31 is a bottom view of a suspension, etc. The connecting line of projections of the two main pins on the ground, and projections of the ball head center of the second ball head rod 5 and the ball head center of the third ball head rod 8 on the ground forms an inverted trapezoid, as shown in FIG. 32, which satisfies the steering trapezoid relationship.

In combination with FIG. 31, when the vehicle runs straight, an axis L7 of a wheel on the right side coincides with an axis L8 of a wheel on the left side, so that the vehicle keeps running straight. FIG. 31 is a bottom view, and the right side and the left side described herein are understood for normal use.

Figure 33:
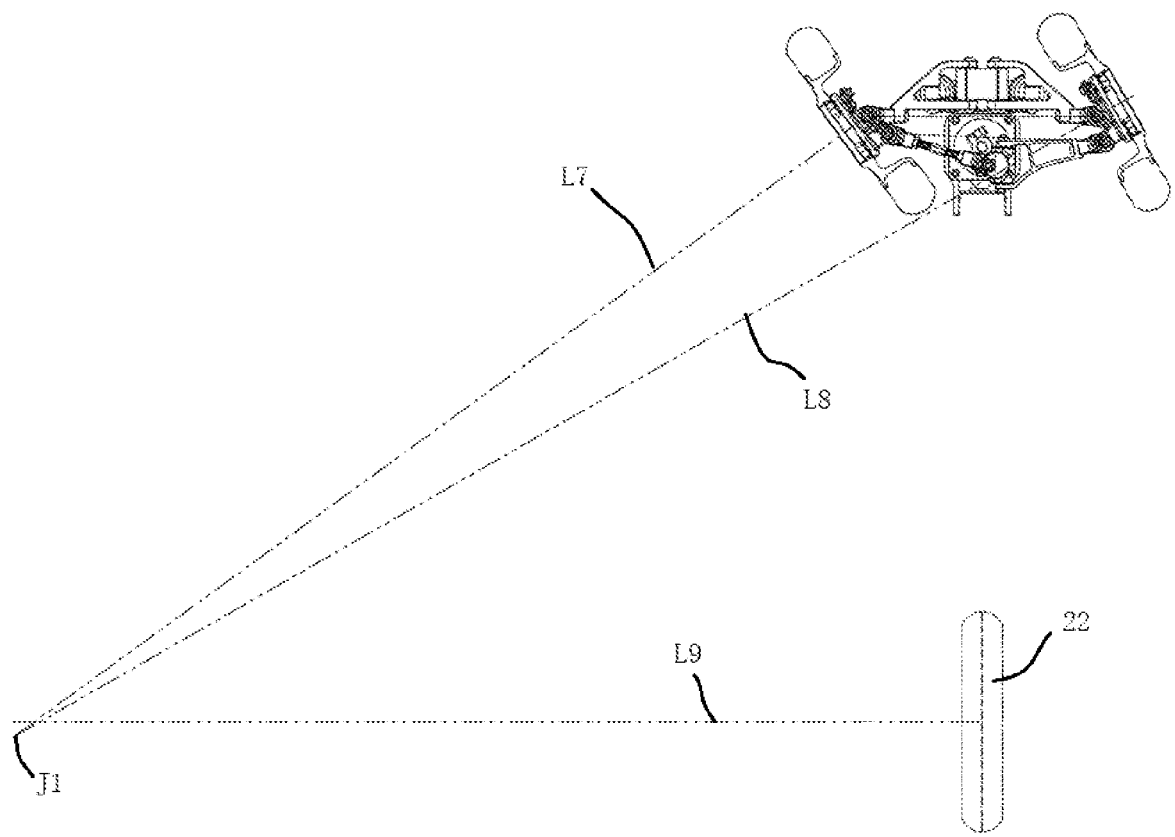
FIG. 33 is a schematic diagram when turning right in Embodiments 2 and 3 according to the present disclosure.
Figure 34:
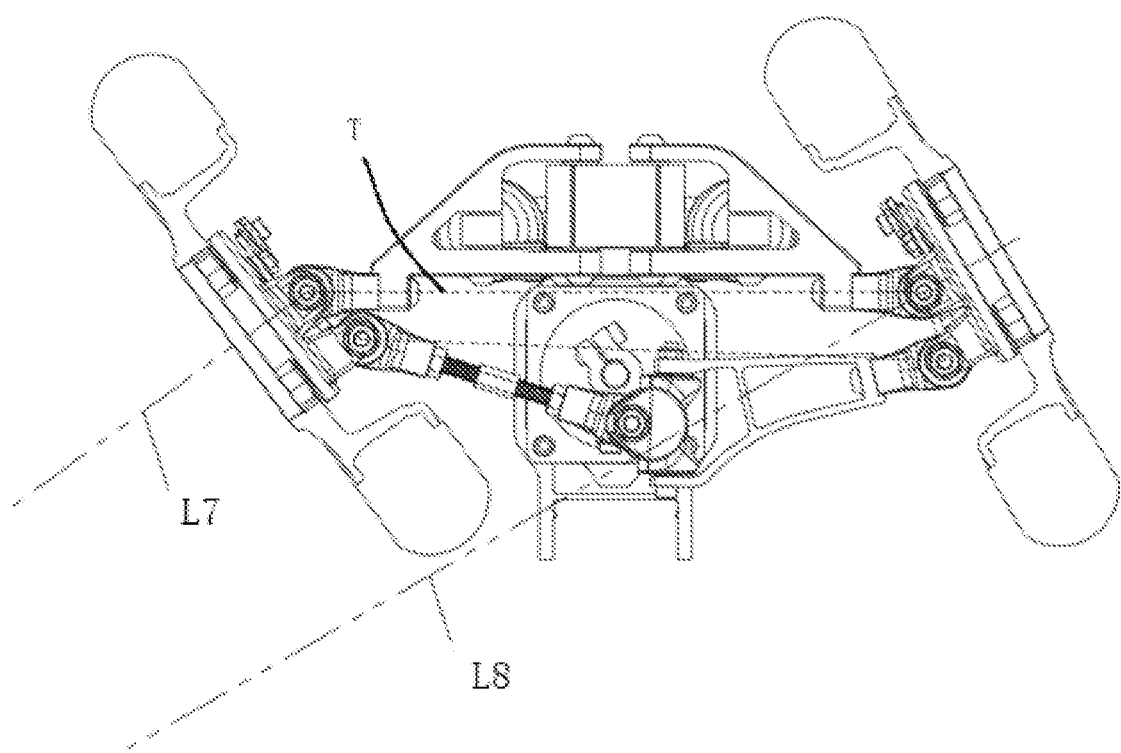
FIG. 34 is a zoom diagram of a partial region in FIG. 33 according to the present disclosure.
Figure 35:
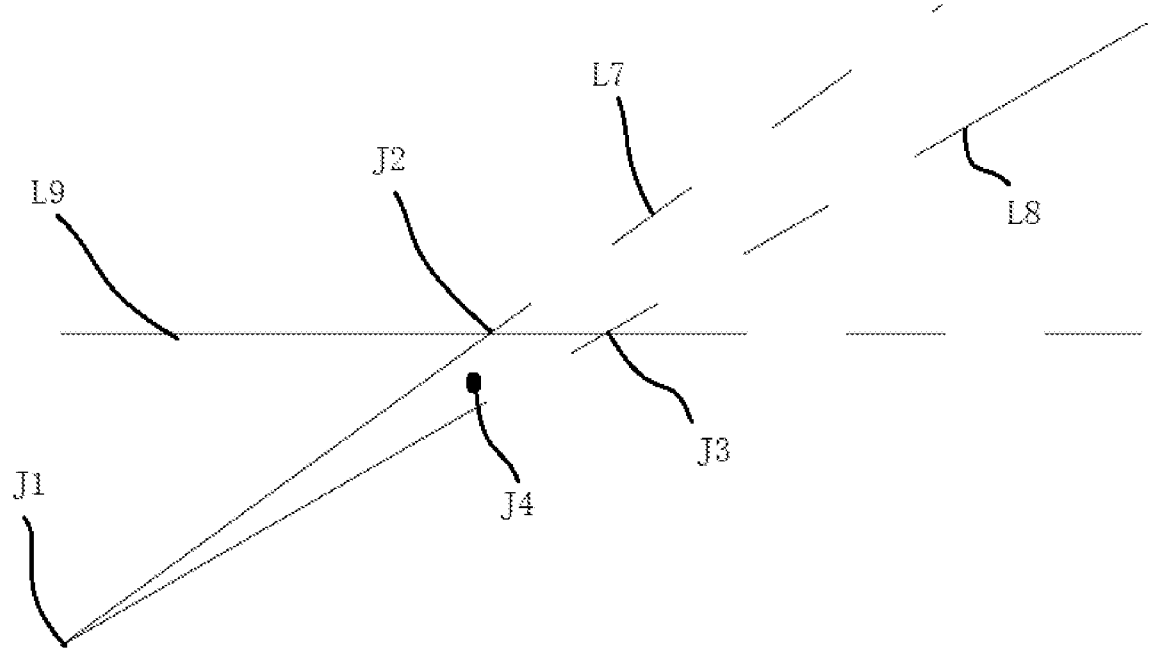
FIG. 35 is a zoom diagram of a partial region in FIG. 33 according to the present disclosure.
Figure 36:
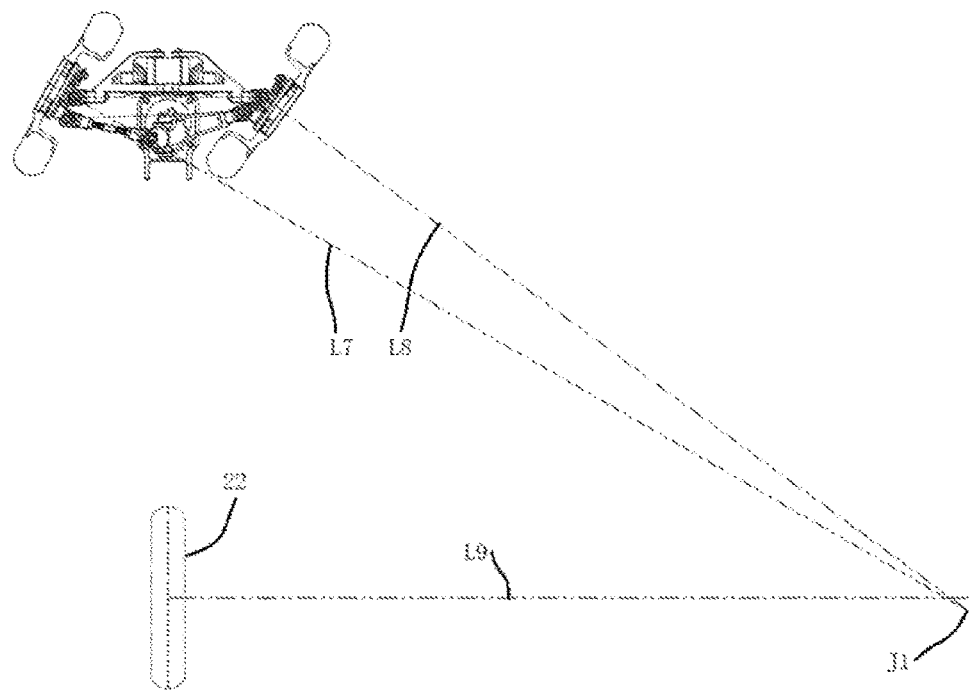
FIG. 36 is a schematic diagram when turning left in Embodiments 2 and 3 according to the present disclosure.

In combination with FIG. 33, FIG. 34, and FIG. 35, when the vehicle turns right, the connecting portion 2 moves to the left around the flat shaft mounting hole 201, and drives the first steering linkage 3 and the second steering linkage 6 to move to the left in a similar translational motion. The second ball head rod 5 and the third ball head rod 8 respectively rotate around the corresponding main pins L6, and the rotating angle of the second ball head rod 5 is greater than the rotating angle of the third ball head rod 8.

The rotating angle of the rotating assembly on the right side is larger than the rotating angle of the rotating assembly on the left side, the axis L7 of the rim 17 on the right side and the axis L8 of the rim 17 on the left side intersect at J1, and during steering, J1 is always near the axis L9 of the rear wheel 22 and even intersects with same, thereby satisfying an ideal steering trapezoid.

In combination with FIG. 35, L7 intersects with L9 at J2, and L8 intersects with L9 at J3. J4 is roughly the overall rotating center of the vehicle, which is close to J1, J2, and J3. Therefore, the tire 18 and ground resistance received by the vehicle during steering is small, and the vehicle can turn easily.

Similarly, when the vehicle turns left, the connecting portion 2 moves to the right around the flat shaft mounting hole 201, and drives the first steering linkage 3 and the second steering linkage 6 to move to the right in a similar translational motion.

The second ball head rod 5 and the third ball head rod 8 respectively rotate around the corresponding main pins L6, and the rotating angle of the second ball head rod 5 is smaller than the rotating angle of the third ball head rod 8.

The rotating angle of the rotating assembly on the right side is smaller than the rotating angle of the rotating assembly on the left side, the axis L7 of the rim 17 on the right side and the axis L8 of the rim 17 on the left side intersect at J1, and during steering, J1 is always near the axis L9 of the rear wheel 22 and even intersects with same, thereby satisfying an ideal steering trapezoid. Thus, the vehicle turns easily.

In this embodiment, a damper 19 can also be mounted, and can refer to the prior art. Thus, the use comfort is improved.

The foregoing are merely descriptions of preferred specific embodiments of the present disclosure, but the protection scope of the present disclosure is not limited thereto. Any equivalent replacement or modification made within a technical scope of the present disclosure by a person skilled in the art according to the technical solutions of the present disclosure and inventive concepts thereof shall fall within the protection scope of the disclosure.

What is claimed is:

1. A steering linkage assembly, comprising:
   a support member;
   a connecting portion rotatably arranged on the support member and connected to an external steering member;
   a first steering linkage;
   a first ball head rod provided with a first end connected to a first ball head at a first end of the first steering linkage and a second end connected to the support member;
   a second steering linkage; and
   a steering rotating shaft mounted at a first end of the second steering linkage and rotatably connected to the support member, wherein a rotating centerline of the steering rotating shaft is not parallel to a rotating centerline of the connecting portion.

2. The steering linkage assembly according to claim 1, further comprising:
   a second ball head rod provided with one end connected to a second ball head at a second end of the first steering linkage; and
   a third ball head rod provided with one end connected to a third ball head at a second end of the second steering linkage.

3. The steering linkage assembly according to claim 2, wherein a first connecting line between a ball head center of the first ball head rod and a ball head center of the second ball head rod has a length of H1; and a second connecting line between a rotating center of the steering rotating shaft and a ball head center of the third ball head rod has a length of H2, wherein H2=H1=H.

4. A suspension, comprising:
an auxiliary frame;
two steering assemblies arranged on both sides of the auxiliary frame; and
two swing arm assemblies distributed symmetrically, wherein the two swing arm assemblies each comprise:
an upper swing arm having a first end provided with an upper rotating shaft and a second end movably connected to the steering assembly, wherein the upper rotating shaft is rotatably connected to the auxiliary frame;
a lower swing arm having a first end provided with a lower rotating shaft and a second end movably connected to the steering assembly, wherein the lower rotating shaft is rotatably connected to the auxiliary frame; and
the steering linkage assembly according to claim 1, wherein
a second end of the first steering linkage is movably connected to the steering assembly; and
a second end of the second steering linkage is movably connected to the steering assembly.

5. A suspension, comprising:
an auxiliary frame;
two steering assemblies symmetrically arranged on both sides of the auxiliary frame; and
two swing arm assemblies distributed symmetrically, wherein the two swing arm assemblies each comprise:
an upper swing arm having a first end provided with an upper rotating shaft and a second end movably connected to the steering assembly;
a lower swing arm having a first end provided with a lower rotating shaft and a second end movably connected to the steering assembly, wherein the lower rotating shaft is rotatably connected to the auxiliary frame; and
the steering linkage assembly according to claim 3, wherein
the second end of the first steering linkage is movably connected to the steering assembly; and
the second end of the second steering linkage is movably connected to the steering assembly.

6. The suspension according to claim 5, wherein
the second end of the first steering linkage is connected to the steering assembly through the second ball head rod;
the second end of the second steering linkage is connected to the steering assembly through the third ball head rod;
the second end of the upper swing arm is connected to the steering assembly through a fourth ball head rod; and
the second end of the lower swing arm is connected to the steering assembly through a fifth ball head rod.

7. The suspension according to claim 6, wherein a third connecting line between a rotating center of the upper rotating shaft and a ball head center of the fourth ball head rod has a length of H3; and a fourth connecting line between a rotating center of the lower rotating shaft and a ball head center of the fifth ball head rod has a length of H4, wherein H4=H3=H; wherein
the first connecting line is parallel to the third connecting line and the fourth connecting line located on the same side; and the second connecting line is parallel to the third connecting line and the fourth connecting line located on the same side.

8. A vehicle, comprising
the suspension according to claim 4,
a vehicle body connected to the auxiliary frame;
a steering member connected to the connecting portion; and
two wheels corresponding to the two steering assemblies, wherein the two wheels each comprise:
a rim connected to one of the two steering assemblies; and
a tire mounted on the rim.

9. The vehicle according to claim 8, wherein
an accommodating tank is provided in the rim; and
the two steering assemblies are each provided with:
a steering mounting hole connected to the second end of the first steering linkage or the second end of the second steering linkage;
an upper mounting hole connected to the second end of the upper swing arm; and
a lower mounting hole connected to the second end of the lower swing arm; wherein
the steering mounting hole, the upper mounting hole, and the lower mounting hole are located in the accommodating tank.

10. The vehicle according to claim 9, wherein an included angle formed between a connecting line of the upper mounting hole and the lower mounting hole and a forward direction of the vehicle is an obtuse angle.

11. A vehicle, comprising
the suspension according to claim 5,
a vehicle body connected to the auxiliary frame;
a steering member connected to the connecting portion; and
two wheels corresponding to the two steering assemblies, wherein the two wheels each comprise:
a rim connected to one of the two steering assemblies; and
a tire mounted on the rim.

12. The vehicle to claim 11, wherein
the second end of the first steering linkage is connected to the steering assembly through the second ball head rod;
the second end of the second steering linkage is connected to the steering assembly through the third ball head rod;
the second end of the upper swing arm is connected to the steering assembly through a fourth ball head rod; and
the second end of the lower swing arm is connected to the steering assembly through a fifth ball head rod.

13. The vehicle according to claim 11, wherein
an accommodating tank is provided in the rim; and
the two steering assemblies are each provided with:
a steering mounting hole connected to the second end of the first steering linkage or the second end of the second steering linkage;
an upper mounting hole connected to the second end of the upper swing arm; and
a lower mounting hole connected to the second end of the lower swing arm; wherein
the steering mounting hole, the upper mounting hole, and the lower mounting hole are located in the accommodating tank.

14. The vehicle according to claim 13, wherein an included angle formed between a connecting line of the upper mounting hole and the lower mounting hole and a forward direction of the vehicle is an obtuse angle.

* * * * *